US010459876B2

(12) United States Patent
Vantrease et al.

(10) Patent No.: US 10,459,876 B2
(45) Date of Patent: Oct. 29, 2019

(54) PERFORMING CONCURRENT OPERATIONS IN A PROCESSING ELEMENT

(71) Applicant: Amazon Technologies, Inc., Seattle, WA (US)

(72) Inventors: Dana Michelle Vantrease, Austin, TX (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 15/885,592

(22) Filed: Jan. 31, 2018

(65) Prior Publication Data

US 2019/0236049 A1 Aug. 1, 2019

(51) Int. Cl.
*G06F 15/80* (2006.01)
*G06N 3/02* (2006.01)
*G06F 17/16* (2006.01)
*G06F 15/173* (2006.01)

(52) U.S. Cl.
CPC ........ *G06F 15/8046* (2013.01); *G06F 15/173* (2013.01); *G06F 17/16* (2013.01); *G06N 3/02* (2013.01)

(58) Field of Classification Search
CPC .................................................. G06F 15/8046
See application file for complete search history.

(56) References Cited

U.S. PATENT DOCUMENTS

| 4,575,812 | A | * | 3/1986 | Kloker | G06F 7/5016 |
| | | | | | 708/603 |
| 5,065,339 | A | * | 11/1991 | Vassiliadis | G06N 3/10 |
| | | | | | 706/42 |
| 5,291,431 | A | * | 3/1994 | Ho | G06F 7/5338 |
| | | | | | 708/630 |
| 5,974,437 | A | * | 10/1999 | Johannsen | G06F 7/5318 |
| | | | | | 708/625 |
| 2018/0005075 | A1 | | 1/2018 | Shacham et al. | |
| 2018/0005110 | A1 | * | 1/2018 | Gokmen | G06N 3/0472 |
| 2019/0026237 | A1 | * | 1/2019 | Talpes | G06F 13/1663 |

OTHER PUBLICATIONS

Pan et al., "Unified Systolic Arrays for Computation of the DCT/DST/DHT", IEEE Transactions on Circuits and Systems for Video Technology, vol. 7, No. 2, Apr. 1, 1997, pp. 413-419.
PCT/US2019/015752 , "International Search Report and Written Opinion", dated Apr. 12, 2019, 13 pages.

* cited by examiner

*Primary Examiner* — William B Partridge
(74) *Attorney, Agent, or Firm* — Kilpatrick Townsend & Stockton LLP

(57) ABSTRACT

A processing element (PE) of a systolic array can perform neural networks computations in parallel on two or more sequential data elements of an input data set using the same weight. Thus, two or more output data elements corresponding to an output data set may be generated in parallel. Based on the size of the input data set and an input data type, the systolic array can process a single data element or multiple data elements in parallel.

20 Claims, 15 Drawing Sheets

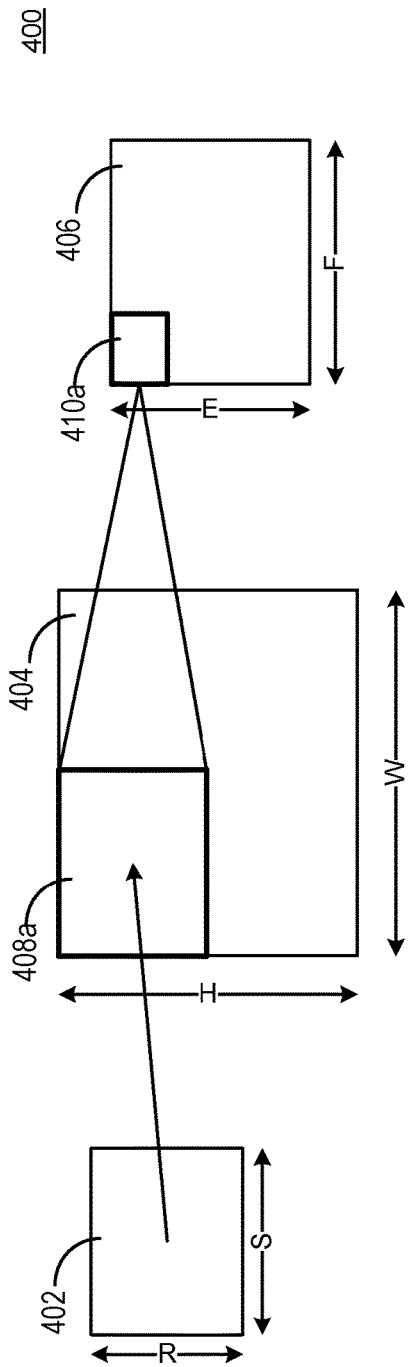
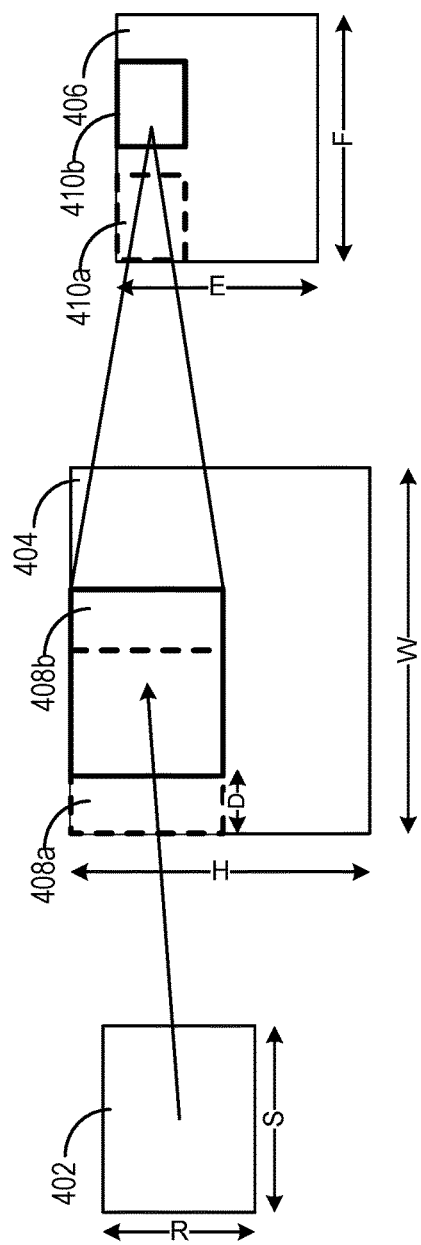
FIG. 4A
FIG. 4B

PERFORMING CONCURRENT OPERATIONS IN A PROCESSING ELEMENT

BACKGROUND

Artificial neural networks are computing systems with an architecture based on biological neural networks. Artificial neural networks can be trained, using training data, to learn about how to perform a certain computing task.

A neural network may include a set of processing elements. Each processing element can process a portion of the input data to generate an output, and the final decision can be generated based on a combination of the outputs of the set of the processing elements. As part of the processing, each processing element can perform a set of arithmetic operations such as, for example, floating-point multiplications and additions, etc. A neural network may be implemented by circuitries and data paths, such as a systolic array, which comprises an array of processing elements capable of performing concurrent arithmetic operations. The utilization rate of a systolic array, as well as the speed of processing, may depend on how the systolic array is mapped to the inputs and outputs of the neural network layer.

BRIEF DESCRIPTION OF THE DRAWINGS

Various embodiments in accordance with the present disclosure will be described with reference to the drawings, in which:

FIG. 4A and FIG. 4B illustrate operations of a convolution layer;

DETAILED DESCRIPTION

Figure 1:
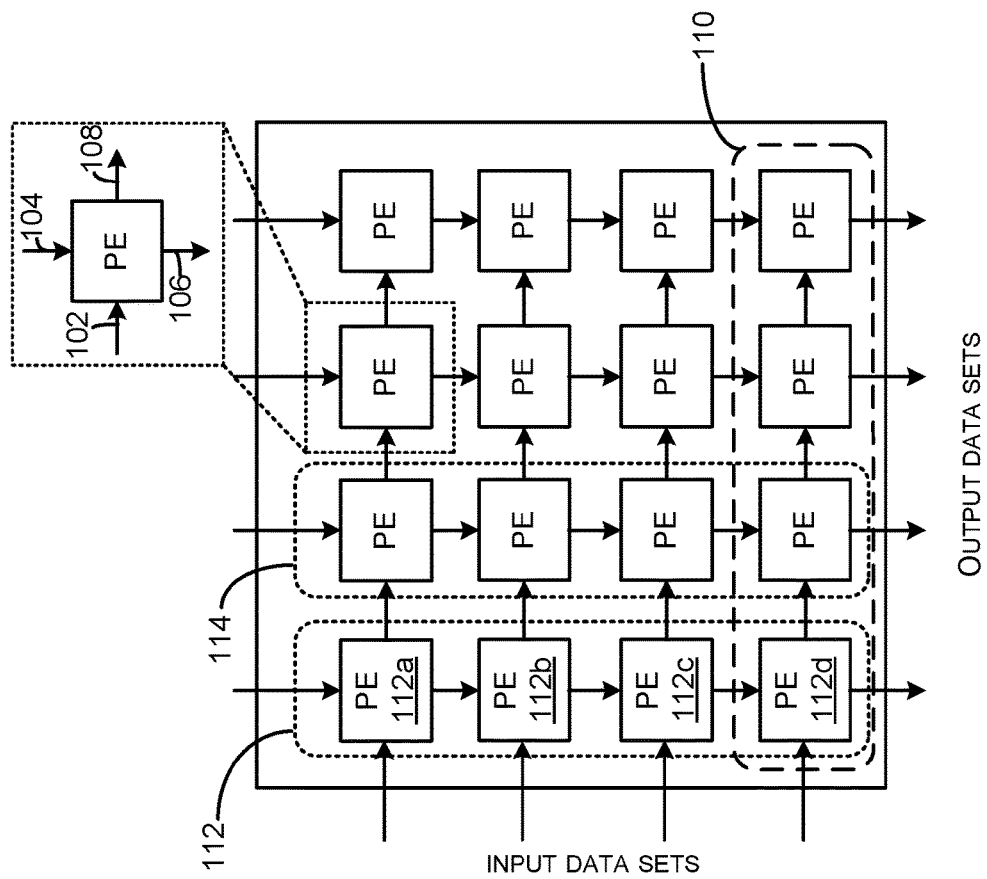
FIG. 1 illustrates an example implementation of a systolic array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the disclosed technologies can provide systems and methods for efficient utilization of the systolic arrays for neural network computations. Systolic arrays may be used to accelerate the workload in deep neural networks. A systolic array may include a plurality of processing elements (PEs), typically arranged in a 2-dimensional grid. According to certain embodiments, each PE in the systolic array can process multiple input data elements from an input data set simultaneously in order to utilize the full computing capacity of the PE. In addition, some embodiments can provide two or more output data elements concurrently corresponding to each output data set which can improve the performance of the systolic array.

A neural network may include multiple interconnected neurons or PEs similar to a vast network of neurons in the brain. The PEs can be divided into layers including, e.g., an input layer, a number of intermediate layers (also known as hidden layers), and an output layer. Each PE of the input layer may receive an element of an input data set, and scale the element with a weight (also called a filter) to indicate the element's degree of influence on the output. The PEs in the intermediate layers may combine the scaled elements received from each PE of the input layer to compute a set of intermediate outputs. For example, each PE in the intermediate layers may compute a sum of the element-weight products, and then generate an intermediate output by applying an activation function to the sum. The intermediate outputs from each PE of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

A convolutional neural network (CNN) is generally a feed-forward artificial neural network. A deep, feed-forward neural network may include multiple hidden layers and an output from one layer may be used as an input to the next layer. Thus, generally the information is fed forward. A CNN artificial neural network has been successfully applied to analyzing visual images. The CNN may be configured to transform an original image layer by layer from original pixel values to a final class score. A convolutional neural network (CNN) may include a number of convolutional and subsampling layers optionally followed by one or more fully connected layers.

Each filter can be convolved (e.g., using a sliding window) across the width and height of the input image and respective dot products can be computed between the entries of the filter and the input pixels at a given position. As the filter is slid over the width and height of the input image, a 2-dimensional feature map (e.g., activation map) may be produced that can provide responses of that filter at every spatial position. Each feature map may then be subsampled typically with mean or max pooling over contiguous regions. Based on the implementation, before or after the subsampling layer an additive bias and sigmoidal nonlinearity may be applied to each feature map. Activation maps may be stacked along the depth dimensions to produce output feature maps. The pooling layer may be used for down sampling operations along with spatial dimensions, e.g., width and height. The fully connected layer may be used to provide the final class score.

Input data (e.g., pixels for an image) and the weights may be received from a host server. Each PE may be capable of performing concurrent arithmetic operations including additions and multiplications on the input data and the weights. The PEs may then pass the input data and the weights to other elements in the systolic array for further processing, e.g., normalization and activation. FIG. 1 illustrates an example of a systolic array, which may include an array of PEs connected in a network.

FIG. 1 illustrates a 4×4 systolic array 100. For example, the systolic array 100 may include four PEs in each row, and four PEs in each column. It will be understood that the systolic array 100 may include any number of PEs in each row and column. Moreover, each PE may include a row input bus 102, a column input bus 104, a column output bus 106, and a row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic operations based on the inputs, and transmit the result of the arithmetic operations to a PE of the same column below (or to the external circuitries) via the column output bus 106. The PE may also forward the inputs received via the row input bus 102 to a right PE of the same row via the row output bus 108.

The systolic array 100 may be configured to perform the arithmetic operations, including multiplications and additions, for the processing elements of a neural network. For example, each PE may include arithmetic units such as a multiplier and an adder. In the example of FIG. 1, each row of the PEs may be configured to handle one set of input data, and each column of the PEs may generate one set of output data based on the sets of input data received by each PE in a given column. In one implementation, a column 112 of the PEs (the leftmost column) may receive four sets of input data, with each set of input data being handled by one row of the PEs. Each PE in the column 112 may obtain, from the corresponding input data set received via the row input bus 102, an input value and an associated weight value, and multiply the input value with the weight value to generate a scaled input. The scaled inputs generated by the PEs within any column (including the column 112) can be accumulated by the adder of each PE. For example, a PE 112a (of the column 112) may generate a first scaled input (from the first input data set), and transmit the first scaled input to a PE 112b via the column output bus 106 as a partial sum. The PE 112b may also generate a second scaled input (from the second input data set) and add the second scaled input to the partial sum. The updated partial sum, accumulated with the first scaled input and the second scaled input, is then transmitted to a PE 112c via the column output bus 106. The partial sums are updated and propagated across the column 112, and a PE 112d may generate a sum of the scaled inputs from the four input data sets. Moreover, each PE in the column 112 can also propagate the input data sets to other PE columns (e.g., a column 114), which can scale the input data sets with a different set of weights from the column 112. Each column of the PEs can perform the arithmetic operations (multiplications and summations) to generate the output elements for other processing elements in parallel. In the example of FIG. 1, the systolic array 100 can generate output elements, in parallel, for four PEs corresponding to the four columns of the systolic array 100.

Although the systolic array 100 can speed up neural network processing by allowing parallel arithmetic operations, the utilization rate of the systolic array may vary based on a size (e.g., a number of bits) of the input data and the processing capacity of the arithmetic units of the processing elements. Generally, the processing elements in the systolic arrays may be designed to operate on the highest precision supported input data type. As an example, the processing elements can support computations for 16-bit fixed point or floating point input data types to achieve certain accuracy. However, in some instances, similar or even better accuracy may be achieved using smaller or low precision data types. In some instances, 8-bit computations may be sufficient to achieve the same accuracy instead of using the 16-bit computations. For example, in some implementations, 8 most significant bits may be ignored when using the 16-bit processing elements to perform 8-bit computations. However, in such cases, as an example, half of the arithmetic processing capacity of the PEs may not be utilized, and the utilization rate of the systolic array may be at 50% or lower. In some instances, certain applications (e.g., image recognition) of neural networks may perform better with 8-bit data types and certain other applications (e.g., product advertising or marketing) may perform better with 16-bit data types. In such cases, it may be desirable to design the hardware for 16-bit data types such that smaller data types (e.g., 4-bit, 8-bit) can also be supported in addition to 16-bit data types. Thus, there is a need for efficient utilization of the systolic array for computations using lower number of bits than the number of bits supported by the PEs.

Embodiments of the disclosed technologies can provide systems and methods for efficient utilization of the systolic arrays. In certain embodiments, each PE in the systolic array can perform single computations or multiple computations simultaneously based on an input data type and a size of the input data set. For example, if the size of the input data set is relatively larger than the size of the systolic array (e.g., 8-bit or 16-bit PEs), the systolic array can perform multiple computations in parallel to efficiently utilize the systolic array based on the input data type (e.g., 4-bits, 8-bits, 16-bits, etc.). In such cases, multiple input data elements from the input data set can be fed to a PE simultaneously in order to utilize the full computing capacity of the PE. For example, two 8-bit, or four 4-bit input data elements may be fed to a PE with the 16-bit computing capacity. The same weight can be used by a given PE for all the inputs to that PE. The weight can be loaded sequentially or in parallel to all the PEs of the systolic array. Each PE may propagate two or more results to the next lower PE in the same column. Each PE may also propagate the received input data elements to another PE on the right within the same row. Thus, the time to process the input data set can be reduced by performing multiple computations in parallel by each PE of the systolic array. In addition, the embodiments can provide two or more output data elements concurrently corresponding to each output data set which can improve the performance of the systolic array. Some embodiments can provide significant improvement in performance for larger input data sets as loading of the weights into the systolic array can be amortized for the larger input data sets.

Figure 2:
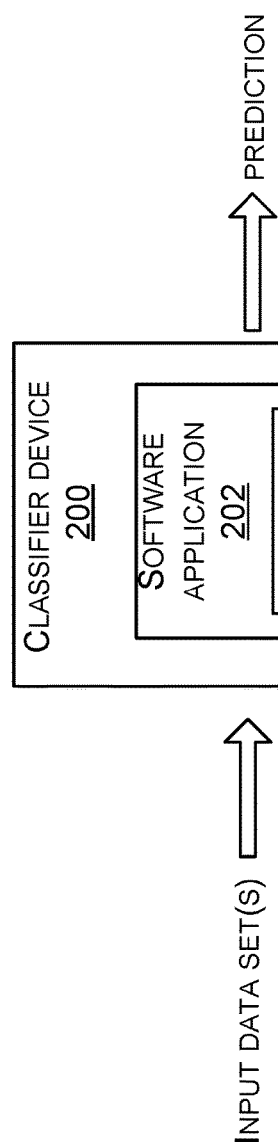
FIG. 2 illustrates an example classifier device that can use techniques disclosed herein to process data.

FIG. 2 illustrates an example classifier device 200 that can use techniques disclosed herein to process data. The classifier device 200 can be, for example, a computing device operating a software application 202 and a prediction model 204 to predict information included in an input data set, and perform a pre-determined function based on the prediction. For example, the classifier device 200 can be part of an image recognition service provided to identify certain objects (e.g., text, a person, etc.) from an image. In some embodiments, the input data set may be similar to an input feature map comprising input feature map elements. It is understood that the image recognition service is merely provided as an illustrative example, and that the techniques disclosed herein can be used for other data processing applications including, for example, text-based data processing (e.g., processing of search queries), audio data processing, etc.

The image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 2, the multi-tenant compute service system may provide the image recognition service when the client needs it and decommissioned when it is no longer needed, such that the resources supporting the image recognition service (e.g., access to the software application 202, and the underlying hardware resources for processing the software application 202) can be reallocated to other clients.

In some instances, the software application 202 may receive pixel data of an image from a user. The image may include an array of pixels. The software application 202 can perform analysis on the pixel data, and predict one or more objects depicted in the image. The analysis may include, for example, comparing the pixel data against a set of pre-determined features data. The pre-determined features data may include data associated with visual image features, non-visual image features, or a combination of the visual and non-visual image features. As to be discussed in more details below, the software application 202 may employ the prediction model 204 to compute a set of scores based on the pixel data of the image to make a prediction. The software application 202 can then determine other information about the content of the image based on the scores. For example, based on the scores, the software application 202 can determine that the image is a certain object (e.g., person, car, tree, etc.).

The prediction model 204 can be in the form of an artificial neural network. The artificial neural network may include a plurality of processing elements, with each processing element configured to process a portion of the input pixel data, or to further process the intermediate outputs from other processing elements. An example prediction model is explained with reference to FIG. 3.

Figure 3:
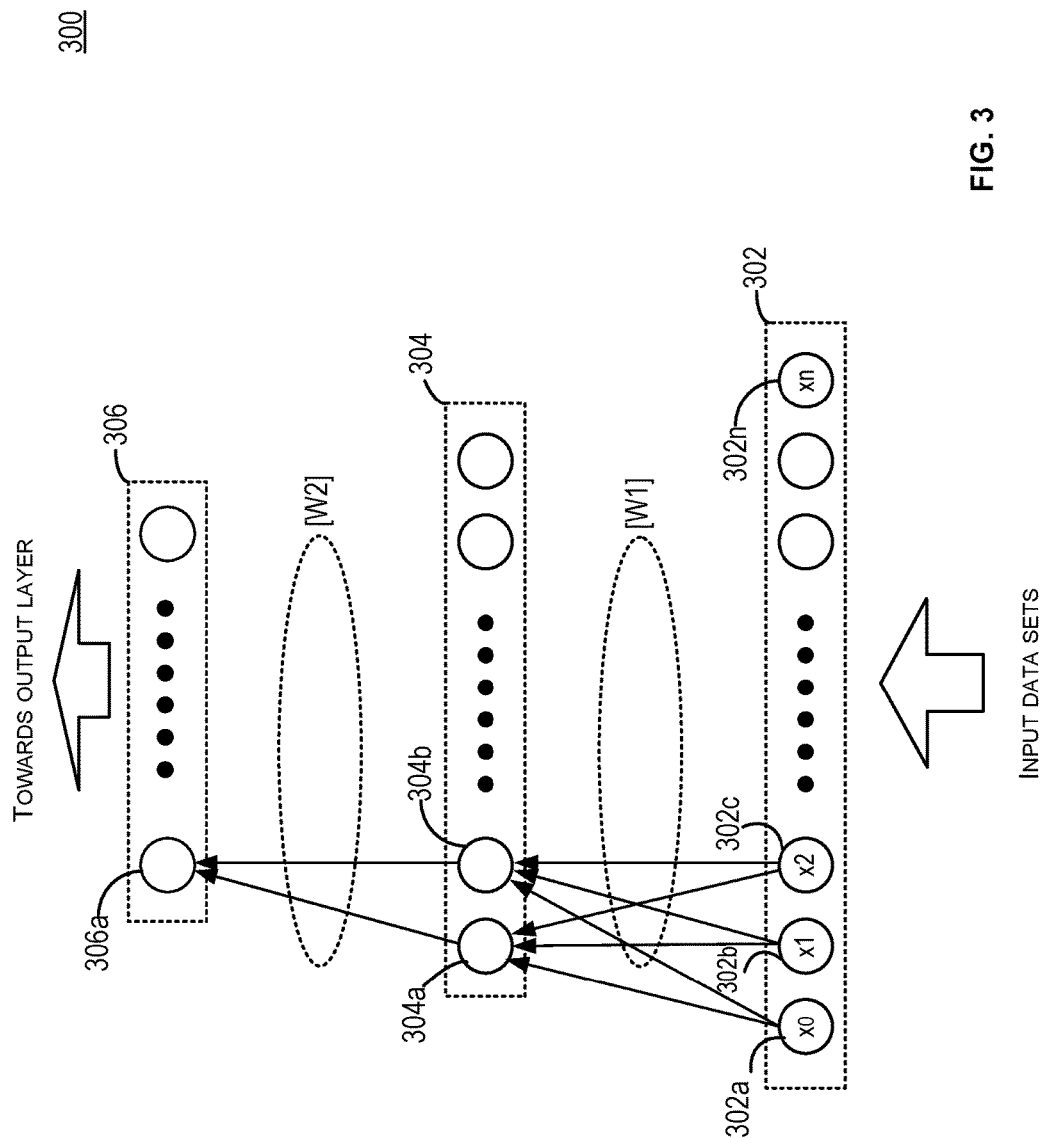
FIG. 3 illustrates an example of a prediction model that can use techniques disclosed herein.

FIG. 3 illustrates an example of a prediction model that can use techniques disclosed herein. In the example of FIG. 3, the prediction model 204 may be a multi-layer neural network 300 such as a deep neural network (DNN), a convolutional neural network (CNN), or any suitable neural network. The prediction model 204 may include an input layer 302, a set of intermediate layers including intermediate layers 304 and 306 and an output layer (not shown in FIG. 3). Each layer may include a respective set of processing elements.

The layer 302 may include PEs 302a, 302b, 302c, ..., 302n. The layer 302 may process an input data set, e.g., pixel data representing different portions of an image. In some instances, each PE of the layer 302 may be assigned to receive a pixel value (e.g., $x_0, x_1, x_2, \ldots, x_n$) corresponding to a pre-determined pixel within the image, and may transmit one or more weights with the received pixel value to the layer 304. In a case where the prediction model 204 is a DNN, each PE of the layer 302 can be assigned a set of weights defined based on a matrix W1. Each PE of the layer 302 can send the received pixel value and the assigned weights to each PE of the layer 304. In a case where the prediction model 204 is a CNN, groups of the PEs of the layer 302 may share a set of weights, and each group may send the set of weights and the pixel values received by the group of PEs to a single PE of the layer 304.

The layer 304 may process the scaled outputs from the layer 302 to generate a set of intermediate outputs. In some instances, a PE 304a of the layer 304 may be connected to a group of PEs in the layer 302, and a PE 304b of the layer 304 may be connected to a group of PEs in the layer 302. As an example, the PE 304b may generate a sum of the scaled outputs received from the layer 302 based on the following equation:

$$\text{Sum}_{304b} = \sum_{i=0}^{n} (W1_i \times x_i) \qquad \text{(Equation 1)}$$

Here, the $\text{sum}_{304b}$ represents a sum generated by the PE 304b. The $W1_i \times x_i$ may represent a scaling of a particular pixel value (e.g., $x_0$) with the associated weight (e.g., $W1_0$) by a PE of the layer 302. In a case where the prediction model 204 is a DNN, each PE of the layer 304 may generate the sum based on the scaling of pixel values from each PE of the layer 302, and then generate a sum (e.g., $\text{sum}_{304b}$) by summing the scaled pixel values. The sum may also represent a dot-product between an input vector comprising a number of elements (e.g., pixel values) and a weight vector (e.g., W1).

On the other hand, in a case where the prediction model 204 is a CNN, each PE of the layer 304 may generate the sum based on the scaling of pixel values from a group of PEs of the layers 302. The sum may represent a convolution result between a group of pixel values and a filter comprising the weight values.

FIG. 4A and FIG. 4B illustrate operations of the convolution layer 304.

In FIG. 4A, a filter 402 may include a two-dimensional array of weights. The weights in the filter 402 may represent a spatial distribution of pixels for certain features to be detected from an input image 404. The input image 404 may include a height of H pixels and a width of W pixels. The filter 402 may have a height of R rows and a width of S columns, and is typically smaller than the input image 404. Each weight in the filter 402 may be mapped to a pixel in a rectangular block of pixel values with the same R rows and S columns. In some implementations, the pixel data in the input image 404 may be referred to as input feature map elements of an input feature map, and may indicate that the pixels are processed by the same filter (or same sets of filters) corresponding to certain feature(s). An output feature map may represent convolution outputs between the filter 402 and the input feature map.

As discussed with reference to FIG. 3, a PE of the layer 304 (e.g., the PE 304b) can receive, from a group of PEs of the input layer 302, a group 408a of pixel values corresponding to a first rectangular block of pixels from the input image 404. The group 408a of pixel values may be presented as a first input data set. The PE 304b may generate a convolution output 410a based on a summation of multiplication results between each weight of the filter 402 and each corresponding pixel in the group 408a according to Equation 1. For example, the PE 304b may generate a dot-product between a matrix represented by the filter 402 and a matrix represented by the group 408a.

As shown in FIG. 4B, another PE of the layer 304 (e.g., the PE 304a) can also receive, from another group of PEs of the input layer 302, a group 408b of pixel values corresponding to a second rectangular block of pixels from the input image 404. The group 408b of pixel values may be presented as a second input data set. The PE 304a may generate a convolution output 410b based on a summation of multiplication results between each weight of the filter 402 and each corresponding pixel in the group 408b according to Equation 1. The PE 304a may generate a dot-product between the matrix of the filter 402 and a matrix represented by the group 408b. In some embodiments, each convolution output in FIG. 4A and FIG. 4B (e.g., the convolution output 410a, the convolution output 410b, etc.) may correspond to the output of a PE of the layer 304. The convolution outputs may correspond to an output feature map indicating the result of processing an input feature map comprising the pixel data in the input image 404 with the filter 402. Each of the convolution output 410a and the convolution output 410b may be in the form of an output data set comprising respective output data elements.

As shown in FIG. 4B, the convolution operations can be arranged in a sliding-window such that the second rectangular block for the group 408b overlaps, or is otherwise adjacent to, the first rectangular block for the group 408a in the input image 404. For example, in the example of FIG. 4B, "D" may indicate a distance of stride (in pixel) of the sliding-window for each convolution operation, such that the block of pixels corresponding to the group 408b may be situated at a distance D (in terms of pixels) from the block of pixels corresponding to the group 408a, and the next block of pixels may also be situated at the same distance D from the group 408b. Other PEs of the layer 304 may also receive groups of pixels corresponding to other rectangular blocks and generate other intermediate outputs. The convolution outputs can be part of a convolution output array 406 with a height of E rows and a width of F columns. The array 406 of convolution outputs can have a smaller height and a smaller width than the input image. Rectangular blocks of the convolution outputs can be further grouped, and convolution operations can be performed at the layer 306 between the groups of convolution outputs and another set of filter weights to generate another set of convolution outputs. In some implementations, the convolution operations can be performed between multiple images and multiple filters. This is further explained with reference to FIG. 5A.

Figure 5A:
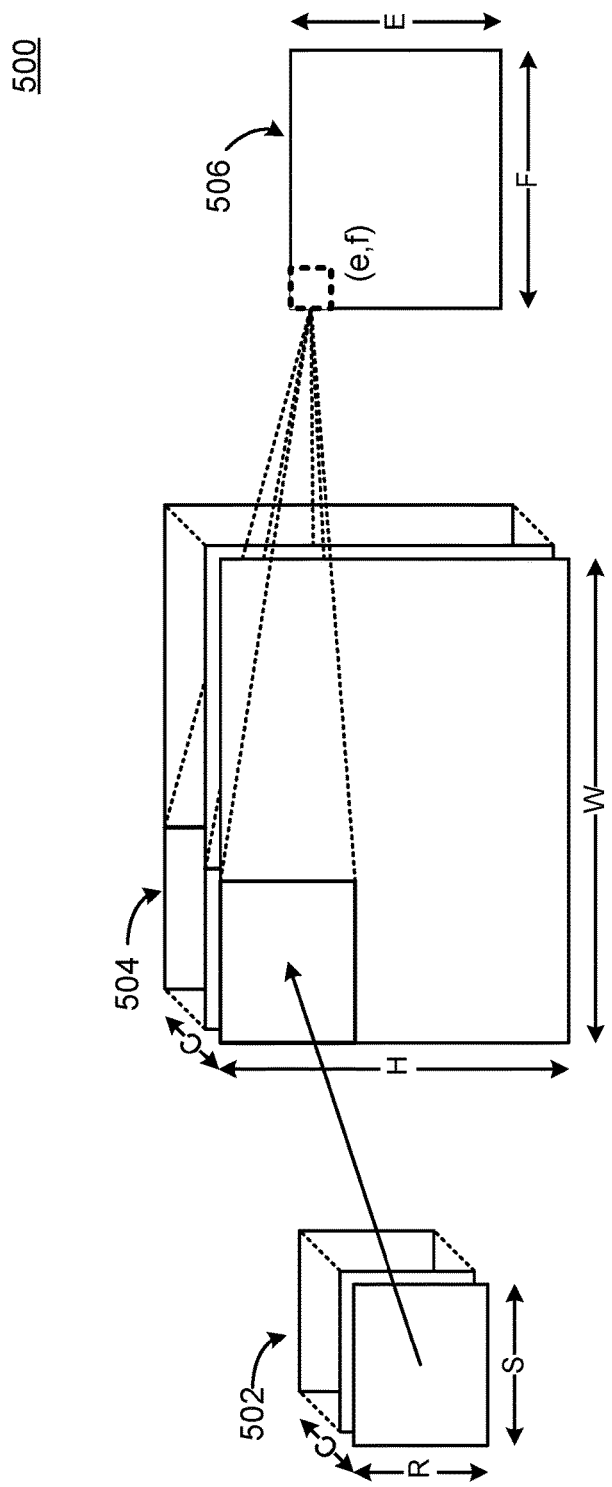
FIG. 5A illustrates an example of the convolution layer operation for a set of images using a set of filters.

FIG. 5A illustrates an example of the convolution layer operation between a set of images and a set of filters.

In some implementations, the convolution operations can be performed between multiple images and multiple filters. As shown in FIG. 5A, a set of C filters 502 may be applied to a set of C images 504. The convolution operations can be performed between each filter of the set of filters 502 and blocks of pixels on the corresponding image of the images 504. The convolution results for each filter-image pair can be summed to generate a convolution output as follows:

$$O_{e,f} = \sum_{r=0}^{R-1} \sum_{s=0}^{S-1} \sum_{c=0}^{C-1} X^{c}_{eD+r,fD+s} \times W^{c}_{r,s} \quad \text{(Equation 2)}$$

Here, the convolution operation involves a set of C images (or pixel arrays). $X^{c}_{eD+r,fD+s}$ may refer to the value of a pixel at an image of index c, within the set of of C images 504, with a horizontal pixel coordinate of eD+r and a vertical pixel coordinate of fD+s. D is the sliding-window stride distance, whereas e and f correspond to the location of the output in a convolution output array 506, which can also correspond to a particular sliding window. Further, r and s may correspond to a particular location within the sliding window. A pixel at an (r, s) location and of an image of index c can also correspond to a weight $W^{c}_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^{c}_{r,s}$. A partial sum of the multiplication products within each sliding window for each of the images within the set of images 504 can be computed. Next, a sum of the partial sums for all the images of the set of images 504 can be computed.

Moreover, in some examples, multiple sets of filters can be used to perform convolution operations with a set of images to generate a set of convolution output arrays, with each convolution output array corresponding to a set of filters. For example, the multiple set of filters may correspond to multiple features (e.g., one set of filters for a first portion of the object, another set of filters for a second portion of the object, etc.) to be detected from the set of images 504, and each convolution output array may correspond to the detection results for each feature from the set of images 504. For example, in a case where M sets of filters are applied to the set of C images to generate M convolution output arrays, Equation 2 can be updated as follows:

$$O^{m}_{e,f} = \sum_{r=0}^{R-1} \sum_{s=0}^{S-1} \sum_{c=0}^{C-1} X^{c}_{eD+r,fD+s} \times W^{c,m}_{r,s} \quad \text{(Equation 3)}$$

Here, the convolution output $O_{e,f}^{m}$ and the weight $W^{c,m}_{r,s}$ have an index m corresponding to one of the M sets of filters.

Figure 5B:
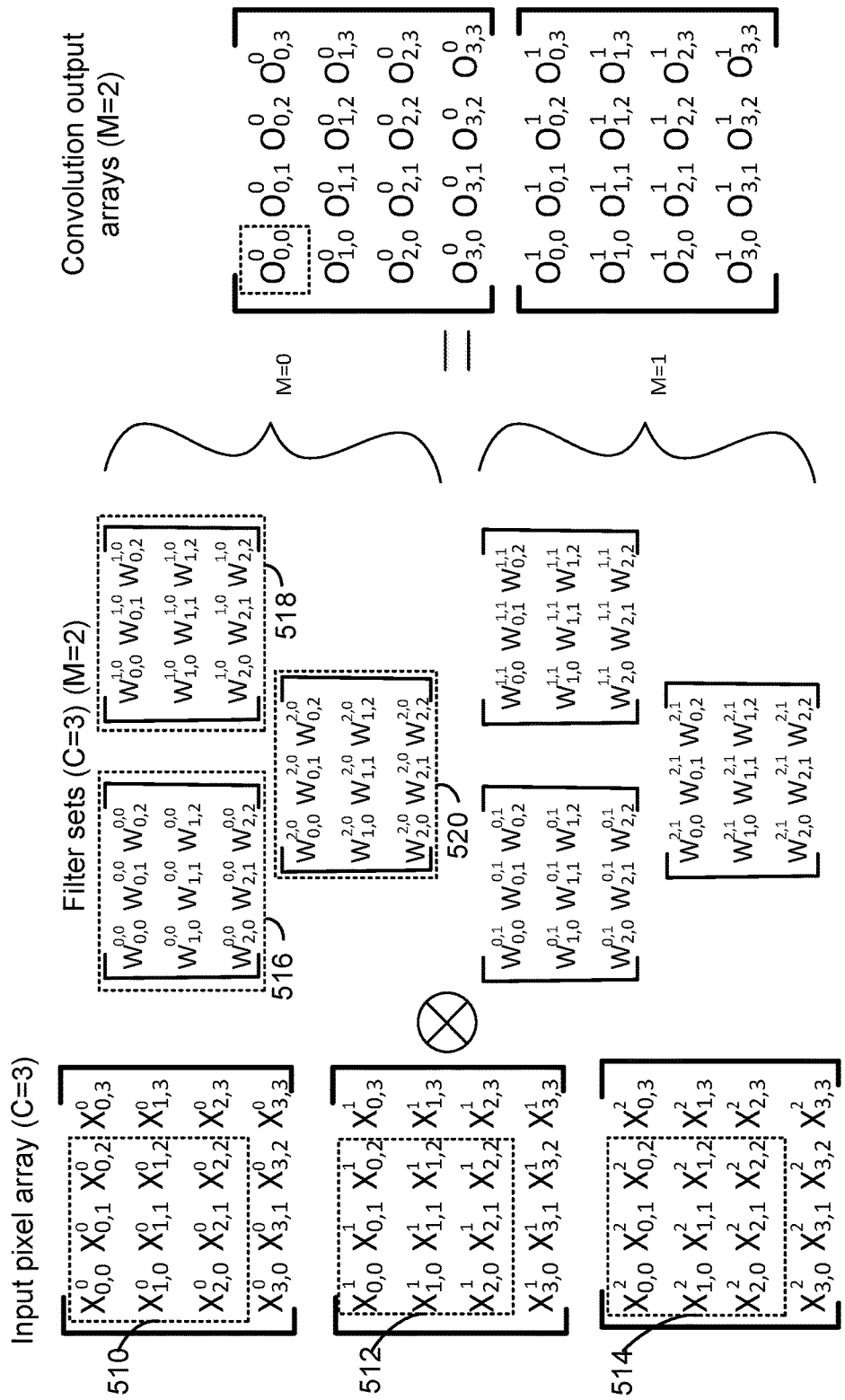
FIG. 5B illustrates another example of the convolution layer operation with C sets of input data and M sets of filters.

FIG. 5B illustrates an example of C sets of input data (with C=3) to be convolved with the M sets of filters (with M=2). Each set of input data corresponds to the entries of a pixel array. Each of the M sets of filters includes a set of C filters which correspond to the C sets of input pixel arrays. The convolution operations may generate M sets of output data sets, with each output data set corresponding to a convolution output array. Each convolution output array may correspond to convolving one set (of the M sets) of filters with the input pixel arrays. For example, $O_{0,0}^{0}$ can be generated by a sum of the dot-product between a group of pixels 510 and a filter array 516, the dot-product between a group of pixels 512 and a filter array 518, and the dot-product between a group of pixels 514 and a filter array 520.

Referring back to FIG. 3, one PE of the layer 304 may be configured to generate the convolution outputs (e.g., one at a time) of one convolution output array, and a set M of PEs of the layer 304 can correspond to a set M of convolution output arrays. The PE of the layer 304 can also process each convolution output with an activation function to generate an activation output. The activation function may translate the convolution output into a decision of whether to forward the convolution output to the intermediate layer 306 to influence the classifier decision (analogous to the firing of an actual biological neuron). An example of the activation function can be a rectified linear unit (ReLu) defined according to the following equation:

$$\text{ReLu}(y) = \max(0, y) \quad \text{(Equation 4)}$$

APE of the layer 304 (e.g., the PE 304*b*) may process the sum with the ReLu function to generate a first intermediate output based on the following equation:

$$\text{first\_intermediate\_output}_{210a} = \text{ReLu}(\text{Sum}_{210a}) \quad \text{(Equation 5)}$$

In a case where the prediction model 204 is a CNN, the prediction model 204 may include a pooling layer (not shown in FIG. 3) to reduce the size of the first intermediate outputs. For example, the pooling layer may perform a down-sampling operation and forward a maximum intermediate output (generated based on the ReLu function) among a group of intermediate outputs (while discarding the rest of the intermediate outputs in the group) to the layer 306.

The layer 306 may further process the scaled intermediate outputs from the layer 304 by, for example, performing additional convolution operations based on different sets of filters. The outputs from each PE of the layer 306 may be forwarded to other higher intermediate layers, or to an output layer (not shown in FIG. 3). The output layer may form an output vector representing, for example, a probability that a certain image feature is included in the image, and/or a probability that the image includes a certain object (e.g., person, car, tree, etc.). For example, the output vector may be compared against a reference vector associated with a portion of the object, or a reference vector associated with the object. A decision about whether the image is an image of a certain object can be determined based on the comparison result.

In some instances, the systolic arrays may not be efficiently utilized. For example, the PEs in a systolic array may be capable of supporting 16-bit input data, however based on the application of the systolic array, only 8-bit computations may be performed by the PEs. In such cases, half of the systolic array may not be utilized. Some embodiments of the disclosed technologies can improve the utilization of the systolic array by processing multiple data elements from the input data set in parallel. For example, a 16-bit PE can perform two 8-bit computations concurrently on a first 8-bit data element and a second 8-bit data element from the same input data set using the same weight value. Thus, the performance of the systolic array can be optimized by generating output data sets in half the amount of time as compared to only performing 8-bit computations at a time.

Figure 6:
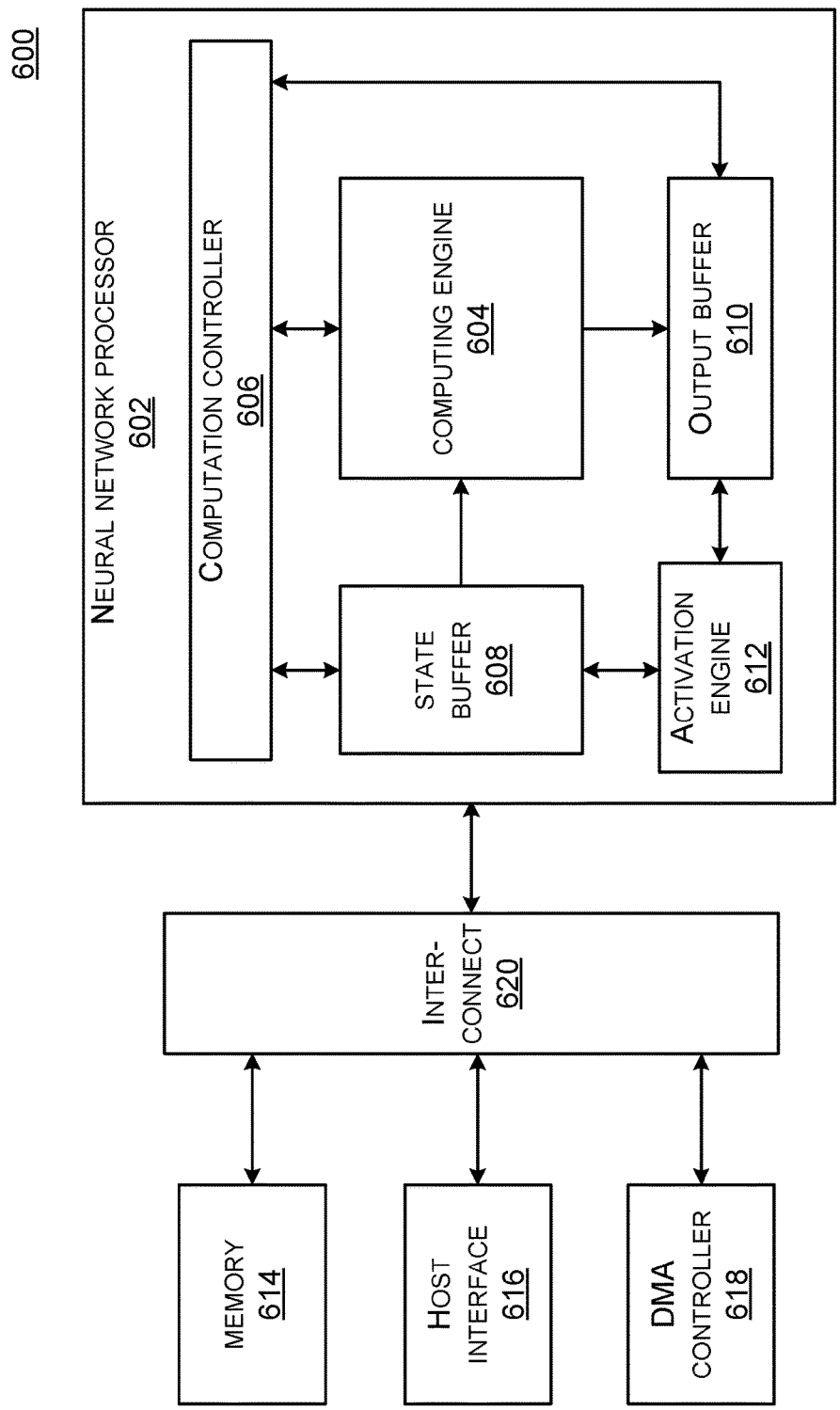
FIG. 6 shows an apparatus for neural network computations according to some embodiments of the disclosed technologies.

FIG. 6 shows an apparatus 600 for neural network computations according to some embodiments of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, etc. The apparatus 600 may provide computing and memory resources for computations with the prediction model 204, as discussed with reference to FIG. 2. In some embodiments, a host device can operate the software application 202 and communicate with the apparatus 600 to make a prediction based on computations with the prediction model 204. For example, the host device can make the prediction by identifying information included in an input data set for an image, text, audio, etc. using the prediction model 204.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. As to be discussed in more details, the neural network processor 602 can provide the computing resources to support the computations with the prediction model 204. The neural network processor 602 may be implemented as a system on chip (SoC), a field programmable gate array (FPGA) or any suitable circuit.

The memory 614 may be configured to store instructions, input data sets (e.g., pixel data of an image) and the weights (e.g., weights corresponding to certain visual and/or non-visual features) received from the host device. The memory 614 may also be configured to store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may be configured to enable communication between the host device and the neural network processor 602. For example, the host interface 616 may be configured to transmit memory descriptors including the memory addresses of the stored data (e.g., input data sets, weights, results of computations, etc.) between the host device and the neural network processor 602. The host interface 614 may include, e.g., a peripheral component interconnect express (PCIe) interface or any suitable interface for communicating with the host device. The host device may include a host processor and a host memory.

The DMA controller 618 may be configured to perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The computation controller 606 may be configured to provide controls to various components of the neural network processor 602 to perform neural network computations. The computation controller 606 may perform scheduling of loading the weights into the computing engine 604. The weights may be stored in the state buffer 608. In one embodiment, the computation controller 606 may schedule loading of the weights for all the PEs in the systolic array sequentially using a respective row data bus. For example, one weight for one PE may be loaded per cycle. In another embodiment, the computation controller 606 may schedule loading of the weights in the systolic array in parallel for each row using a respective column data bus for each PE in a given row. For example, weights for each row may be loaded in parallel per cycle. In some implementations, the computation controller 606 may determine a data type for the input data set based on the instructions received from the host device. For example, the instructions may be stored in the state buffer 608. The instructions may be in the form of an opcode. The data type may indicate a size and a type of the input data element, e.g., 4-bit, 8-bit, 16-bit, signed, unsigned or floating point.

In some embodiments, the computation controller 606 may determine an operating mode of the computing engine 604 based on the data type and the size of the input data set. For example, if the input data set is much larger (e.g., 2000 data elements) than the size of the systolic array (e.g., 16×16), the computation controller 606 may switch the operating mode of the computing engine 604 to an optimization mode. The optimization mode may enable the computing engine 604 to perform multiple computations in parallel for each input data set. For example, each PE can perform four 4-bit computations in parallel for the 4-bit data type, or two 8-bit computations in parallel for the 8-bit data type. It will be understood that based on the size of the PE, the number of input data elements that can be processed concurrently by the PE may vary, without deviating from the scope of the disclosed technologies. For example, for a 32-bit PE, the optimization mode can enable the computing engine 604 to perform four 8-bit computations, eight 4-bit computations, two 16-bit computations, etc. In some other instances, if the input data set is smaller or comparable (e.g., 200 data elements) to the size of the systolic array (e.g., 16×16), switching the operating mode of the computing engine 604 to the optimization mode may not be very effective since loading of the weights into the systolic array may not be amortized with the smaller data set.

The state buffer 608 may be configured to provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The output buffer 610 may include a set of registers to store the output data sets generated by the computing engine 604. The output buffer 610 may also enable additional processing such as, e.g., pooling operation to reduce the size of the stored outputs. In some implementations, the computing engine 604 can be operated to perform computations for a particular neural network layer, and the output buffer 610 can process the outputs of that neural network layer and store the processed output data sets (with or without processing by the activation engine 612) at the state buffer 608. In some embodiments, the output buffer 610 may include adders to accumulate the partial sums generated for different sets of filters (e.g., M) and input data sets (e.g., C) to generate the convolution output array 506, as discussed with reference to FIG. 5A. The final output value of the convolution output array 506 stored in the state buffer 608 can be retrieved by the computation controller 606 for storing at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

The computing engine 604 may be configured to perform computations for the neural network. In some embodiments, the computing engine 604 may include a set of PEs configured to perform one or more arithmetic operations involved in the neural network computations. Each PE may perform matrix multiplication and matrix convolution using input data sets and associated weights. The weights and the input data sets can be obtained from the state buffer 608 using one or more interfaces. An example structure of the computing engine 604 is discussed with reference to FIG. 7.

Figure 7:
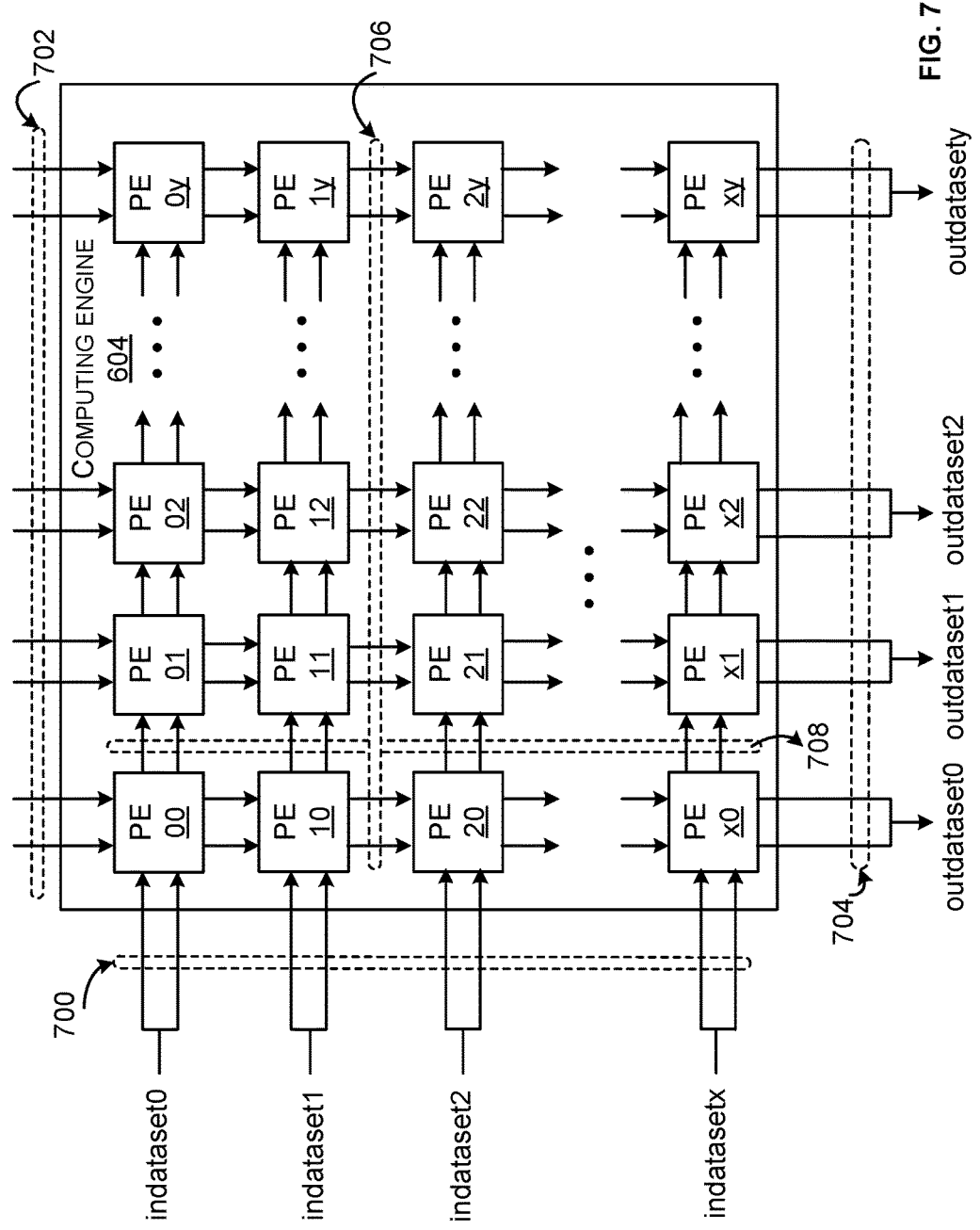
FIG. 7 shows an internal structure of a computing engine according to some embodiments of the disclosed technologies.

FIG. 7 shows an internal structure of the computing engine 604 according to some embodiments of the disclosed technologies. In some implementations, the computing engine 604 may include a two-dimensional array of PEs arranged in multiple rows and columns, where the rows can represent a first dimension and the columns can represent a second dimension. As used herein, the "rows" and the "columns" are interchangeable and are used to represent different dimensions of a two-dimensional array.

Each row of the array may include "x" number of PEs and each column of the array may include "y" number of PEs. For example, "x" and "y" may be 16, 32, 64, 128 or any suitable positive integer. In some embodiments, PE 00, PE 10, PE 20, . . . , PE x0 of a leftmost column of the array may be connected to the state buffer 608 via a set of external row buses 700. Neighboring PEs within each row (e.g., PE 00, PE 01, PE 02, . . . , PE 0y) may be connected with each other via internal row buses 706. Moreover, neighboring PEs within each column may be connected with each other via internal column buses 708. PE 00, PE 01, PE 02, . . . , PE 0y of a topmost row may be connected to the state buffer 608 via a set of external input column buses 702. In some instances, the external input column buses 702 may be driven by the computation controller 606 to zero to reset the computations in the computing engine 604. Additionally, the PE x0, PE x1, PE x2, . . . , PE xy of the bottom row may be connected to the output buffer 610 via a set of external column buses 704.

The external row buses 700 and the external input column buses 702 may also be used to load the weights, sequentially or in parallel, in the computing engine 604. In one embodiment, the weights may be loaded sequentially for each row of the systolic array via the external input column buses 702. For example, the weights may be loaded from the state buffer 608 into the PE 00, PE 10, PE 20, . . . , PE x0 of the leftmost column via the external input column buses 702. The weights may further be shifted for each row to a neighboring PE in the right column via the internal column buses 708. In another embodiment, the weights may be loaded in parallel for each row of the systolic array via the external input column buses 702. For example, the weights may be loaded from the state buffer 608 into the PE 00, PE 01, PE 02, . . . , PE 0y of the topmost row via the external input column buses 702. The weights may further be shifted for each column to a neighboring PE in the row below via the internal row buses 706.

In certain embodiments, two or more data elements of a same input dataset may be fed to each row using a respective interface. As shown in FIG. 7, two data elements from a first input dataset "indataset0" may be fed simultaneously to the PE 00, from a second input dataset "indataset1" may be fed to the PE 10, from a third input dataset "indataset2" may be fed to the PE 20, and from an $x^{th}$ input dataset "indatasetx" may be fed to the PE x0. Referring back to FIG. 5B, in one instance, the indataset0 may include data elements corresponding to the group of pixels 510, the indataset1 may include data elements corresponding to the group of pixels 512, and the indataset2 may include data elements corresponding to the group of pixels 514.

Each PE in the last row may accumulate results from the PEs in the rows above for a given column. As shown in FIG. 7, the PE x0 may generate one or more output data elements corresponding to a first output dataset "outdataset0", the PE x1 may generate one or more output data elements corresponding to a second output dataset "outdataset1", the PE x2 may generate one or more output data elements corresponding to a third output dataset "outdataset2", and the PE xy may generate one or more output data elements corresponding to a $y^{th}$ output dataset "outdatasety."

Figure 8:
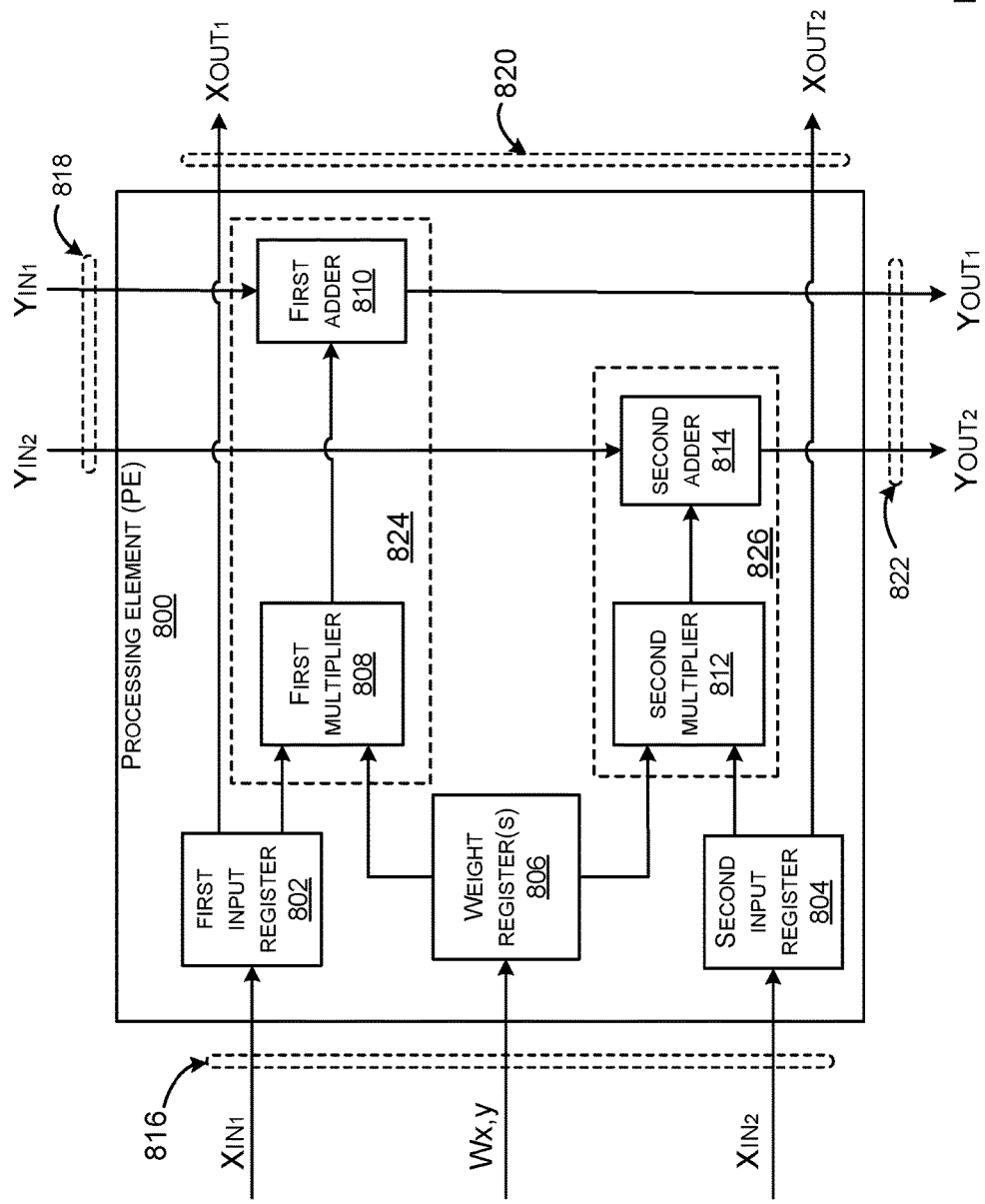
FIG. 8 shows a block diagram of a processing element (PE) according to some embodiments of the disclosed technologies.

FIG. 8 shows an example block diagram of a PE 800 according to some embodiments of the disclosed technologies. The PE 800 may be any of the PEs of the computing engine 604 as shown in FIG. 7. The PE 800 may include a first input register 802, a second pipeline register 804, a weight register 806, a first multiplier 808, a first adder 810, a second multiplier 812, and a second adder 814. In some implementations, each of the first adder 810, and the second adder 814 may be 8-bit adders and each of the first multiplier 808 and the second multiplier 812 may be 8-bit multipliers. The PE 800 may be implemented using any suitable circuit.

The PE 800 may include a first input port to receive a first row input data $X_{IN1}$ and a second input port to receive a second row input data $X_{IN2}$. According to some embodiments, the first row input data $X_{IN1}$ and the second row input data $X_{IN2}$ may be sequential elements from an input data set. The PE 800 may include a third input port to receive a first Yin element and a fourth input port to receive a second Yin element for a given column of the PE 800.

The first input register 802 may be configured to buffer the first row input data $X_{IN1}$ to provide to the first multiplier 808. The first input register 802 may also provide the buffered first row input data $X_{IN1}$ as a first row output data $X_{OUT1}$ to a neighboring PE to the right of the PE 800. The second input register 804 may be configured to buffer the second row input data $X_{IN2}$ to provide to the second multiplier 812. The second input register 804 may also provide the buffered second row input data $X_{IN2}$ as a second row output data $X_{OUT2}$ to a neighboring PE to the right of the PE 800. In some implementations, the first row input data $X_{IN1}$ and the second row input data $X_{IN2}$ may include 8-bits each.

In some embodiments, the PE 800 may receive the first row input data $X_{IN1}$ and the second row input data $X_{IN2}$ concurrently via a first interface, and the first column input data $Y_{IN1}$ and the second column input data $Y_{IN2}$ concurrently via a second interface. In different embodiments, the term "concurrent" may imply occurring simultaneously (at the same time), in parallel, or within a certain time period. The weight $W_{X,Y}$ may be loaded into the PE 800 via the first interface or the second interface. In some implementations, the first row input data $X_{IN1}$, the second row input data $X_{IN2}$, and the weight $W_{X,Y}$ may be part of a row input data bus 816. For example, the row input data bus 816 may be a wider bus which may include an 8-bit first row input data $X_{IN1}$, an 8-bit second row input data $X_{IN2}$, an 8-bit weight $W_{X,Y}$, and control bits (e.g., data type, opcode, etc.). The row input data bus 816 may be split into the first row input data $X_{IN1}$, the second row input data $X_{IN2}$, the weight $W_{X,Y}$, and the control bits using a splitter (not shown). In some implementations, the row input data bus 816 may be similar to the row input bus 102 as discussed with reference to FIG. 1. In some embodiments, the first row output data $X_{OUT1}$ and the second row output data $X_{OUT2}$ may be part of a row output data bus 820. Based on the implementation, the row output data bus 820 may also include the $W_{X,Y}$ and the control bits. For example, the row output data bus 820 for the PE 800 may be the row input data bus 816 for the neighboring PE to the right of the PE 800.

The weight register 806 may be configured to cache a weight value $W_{X,Y}$ for the PE 800. In some embodiments, the weight value $W_{X,Y}$ may include 8-bits. The weight value $W_{X,Y}$ may be cached in a single 8-bit weight register 806 or in two 8-bit weight registers 806. For example, a first 8-bit weight register 806 value may be fed to the first multiplier 808 and a second 8-bit weight register 806 value may be fed to the second multiplier 812. Thus, according to some embodiments, use of the single weight value for each PE to perform both arithmetic computations can provide overall reduced storage area for the array.

The first multiplier 808 may be configured to perform a multiplication operation between the $W_{X,Y}$ value with the first row input data $X_{IN1}$ to generate a first intermediate result, which may be fed to the first adder 810. The first adder 810 may also be configured to receive a first column input data $Y_{IN1}$, and perform an addition operation between the first column input data $Y_{IN1}$ and the first intermediate result to generate a partial sum represented by a first column output data $Y_{OUT1}$. In some implementations, the first multiplier 808 may multiply the 8-bit $W_{X,Y}$ value with the 8-bit first row input data $X_{IN1}$ to generate a 16-bit multiplication result. The first adder 810 may add the 16-bit multiplication result from the first multiplier 808 with a 16-bit first column input data $Y_{IN1}$ to generate a 16-bit partial sum and optional overflow bit(s), together represented by the first column output data $Y_{OUT1}$.

The second multiplier 812 may be configured to perform a multiplication operation between the $W_{X,Y}$ value with the second row input data $X_{IN2}$ to generate a second intermediate result, which may be fed to the second adder 814. The second adder 814 may also be configured to receive a second column input data $Y_{IN2}$, and perform an addition operation between the second column input data $Y_{IN2}$ and the second intermediate result to generate a partial sum represented by a second column output data $Y_{OUT2}$. In some implementations, the second multiplier 812 may multiply the 8-bit $W_{X,Y}$ value with the 8-bit second row input data $X_{IN2}$ to generate a 16-bit multiplication result. The second adder 814 may add the 16-bit multiplication result from the second multiplier 812 with a 16-bit second column input data $Y_{IN2}$ to generate a 16-bit partial sum and optional overflow bit(s), together represented by the second column output data $Y_{OUT2}$.

In certain embodiments, the first multiplier 808 and the second multiplier 812 may perform the respective multiplication operations concurrently to generate the first intermediate result and the second intermediate result simultaneously or within a certain time period. For example, the first multiplier 808 and the second multiplier 812 may perform the respective multiplication operations in parallel within a time period "t1." Similarly, the first adder 810 and the second adder 814 may perform the respective addition operations concurrently to generate the first column output data $Y_{OUT1}$ and the second column output data $Y_{OUT2}$ simultaneously or within a certain time period. For example, the first adder 810 and the second adder 814 may perform the respective addition operations in parallel within a time period "t2." The time periods "t1" and "t2" may include the same values or different values.

The PE 800 may receive the first column input data $Y_{IN1}$ and the second column input data $Y_{IN2}$ concurrently via a second interface. For example, in some implementations, the first column input data $Y_{IN1}$ and the second column input data $Y_{IN2}$ may be part of a column input data bus 818. The column input data bus 818 may be an external input data bus or a column output data bus from a neighboring PE directly above the PE 800 in the same column. The column output data bus from a neighboring PE directly above in the same column may include a first partial sum and a second partial sum. The first partial sum may represent a sum of all of the multiplication results generated by the first multipliers of each of the PEs within that column and up to that prior PE. The second partial sum may represent a sum of all of the multiplication results generated by the second multipliers of each of the PEs within that column and up to that prior PE. It will be understood that the column input data bus 818 may include other relevant bits, which are not discussed here for the purposes of simplicity. For example, the column input data bus 818 may also include one of more overflow bits, an opcode, etc. In some embodiments, the column input data bus 818 may be used to load the $W_{X,Y}$ value in the weight registers 806. Thus, certain embodiments can allow loading the $W_{X,Y}$ value in parallel for all the PEs in a given row of the systolic array using the respective column input data bus 818. The column input data bus 818 may be split into the first column input data $Y_{IN1}$ and the second column input data $Y_{IN2}$ using a splitter (not shown). In some implementations, the first column input data $Y_{IN1}$ and the second column input data $Y_{IN2}$ may be buffered and the respective buffered outputs may be provided to the first adder 810 and the second adder 814.

In some implementations, the first column output data $Y_{OUT1}$ and the second column output data $Y_{OUT2}$ may be part of a column output data bus 822. The column output data bus 822 may be an external output data bus or a column input data bus to another neighboring PE directly below the PE 800 in the same column. For example, the column output data bus 822 may include a first column input data $Y_{IN1}$, a second column input data $Y_{IN2}$ and other relevant bits (e.g., overflow, opcode, etc.), which are not discussed here for the purposes of simplicity.

In some embodiments, for floating point data type, the first intermediate result and the second intermediate result may be rounded to a certain number of bits before feeding to the first adder 810 and the second adder 814 respectively. Furthermore, additional rounding may be performed on the partial sums generated by the first adder 810 and the second adder 814. In certain other embodiments, the multiplication and addition operations may be fused or integrated together to perform a single step multiply add operation with a single rounding using a fused multiplier adder or fused multiplier accumulator instead of performing multiplication and addition operations in different steps. Thus, speed and accuracy of the floating point arithmetic operations may be improved using the fused multiplier adders. For example, as shown in FIG. 8, a first fused multiplier adder (FMA) 824 may be used in place of the first multiplier 808 and the first adder 810 to perform the first multiply and addition operation. Similarly, a second FMA 826 may be used in place of the second multiplier 812 and the second adder 814 to perform the second multiply and addition operation. The first FMA 824 and the second FMA 826 may perform their respective single step multiply add operations with a single rounding.

In some embodiments, in place of the first multiplier 808 and the second multiplier 812, a single multiplier may be used which may be capable of performing the first and the second multiplication operations. For example, instead of two 8-bit multipliers, or four 4-bit multipliers, a single 16-bit multiplier can be used to generate two or four multiplication results simultaneously. Similarly, in some implementations, in place of the first adder 810 and the second adder 814, a single adder may be used which may be capable of performing the first and the second addition operations. For example, instead of two 8-bit adders, or four 4-bit adders, a single 16-bit adder can be used to generate two or four sums simultaneously. Thus, processing multiple data elements of an input data set concurrently by the same PE can fully utilize the computing capacity of the systolic array.

FIG. 9A, FIG. 9B, FIG. 9C, and FIG. 9D show cycle-by-cycle computations through a systolic array, according to certain embodiments of the disclosed technologies.

Figure 9A:
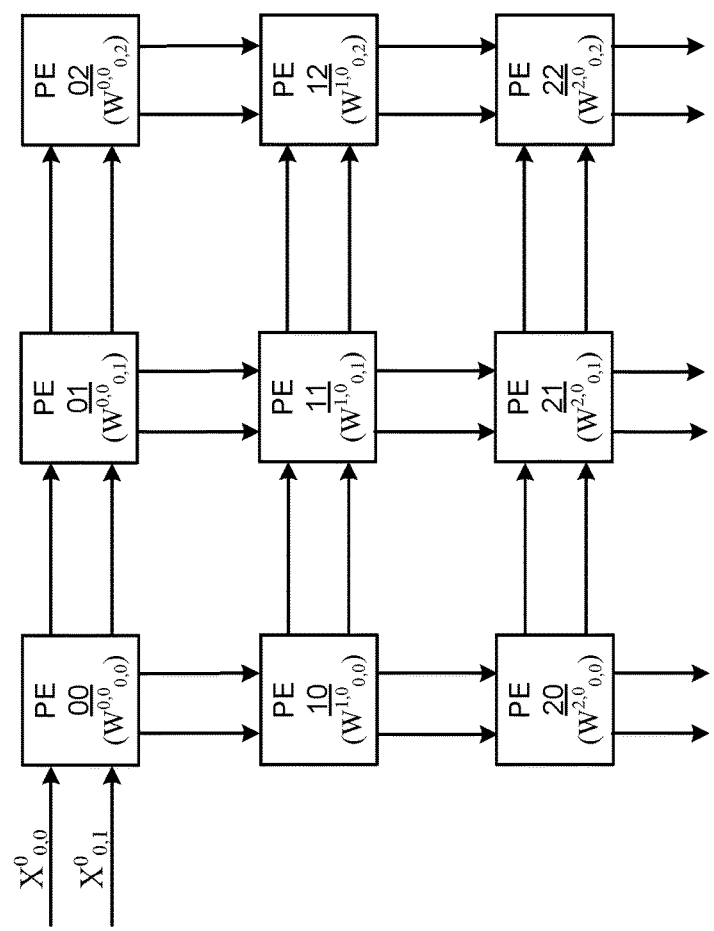
FIG. 9A, FIG. 9B, FIG. 9C and FIG. 9D show cycle-by-cycle computations through a systolic array, according to certain embodiments of the disclosed technologies.

As shown in FIG. 9A, an example systolic array 900 may comprise 3x3 PEs. The systolic array 900 may be part of the computing engine 604 as discussed with reference to FIG. 7. Each PE in the systolic array 900 may be similar to the PE 800 as discussed with reference to FIG. 8. For the purposes of simplicity, it can be assumed here that the weights have been loaded into all the PEs of the systolic array 900. The weights may have been loaded sequentially, in parallel, or using a combination thereof. Note that other methods of loading the weights are also possible within the scope of the disclosed technologies.

Each row in the array 900 may be configured to process a different input data set. For example, a first row comprising a PE 00, a PE 01, and a PE 02 may be configured to process the indataset0. A second row comprising a PE 10, a PE 11, and a PE 12 may be configured to process the indataset1. A third row comprising a PE 20, a PE 21, and a PE 22 may be configured to process the indataset2. In some embodiments, the indataset0, indataset1, and indataset2 may correspond to three channels (e.g., red, green, and blue), as discussed with reference to FIG. 5A (e.g., C is equal to three). The indataset0, indataset1, and indataset2 may have been received from the host device via the host interface 616 and stored in the state buffer 608. Referring back to FIG. 5B, the indataset0 may correspond to the group of pixels 510, the indataset1 may correspond to the group of pixels 512 and the indataset2 may correspond to the group of pixels 514. For example, the indataset0 may include data elements $[X^0_{0,0}, X^0_{0,1}, X^0_{0,2}, X^0_{1,0}, X^0_{1,1}, X^0_{1,2}, X^0_{2,0}, X^0_{2,1}, X^0_{2,2}]$, the indataset1 may include data elements $[X^1_{0,0}, X^1_{0,1}, X^1_{0,2}, X^1_{1,0}, X^1_{1,1}, X^1_{1,2}, X^1_{2,0}, X^1_{2,1}, X^1_{2,2}]$, and the indataset2 may include data elements $[X^2_{0,0}, X^2_{0,1}, X^2_{0,2}, X^2_{1,0}, X^2_{1,1}, X^2_{1,2}, X^2_{2,0}, X^2_{2,1}, X^2_{2,2}]$.

According to an embodiment, two external sequential input elements may be fed simultaneously to the PE 00 every cycle using a first interface (e.g., the row input data bus 816). For example, as shown in FIG. 9A, in a first cycle, a first input element $X^0_{0,0}$ and a second input element $X^0_{0,1}$ from the indataset0 may be fed to the PE 00. In some instances, the first input element $X^0_{0,0}$ may be similar to the $X_{IN1}$ and the second input element $X^0_{0,1}$ may be similar to the $X_{IN2}$ as discussed with reference to FIG. 8.

Figure 9B:
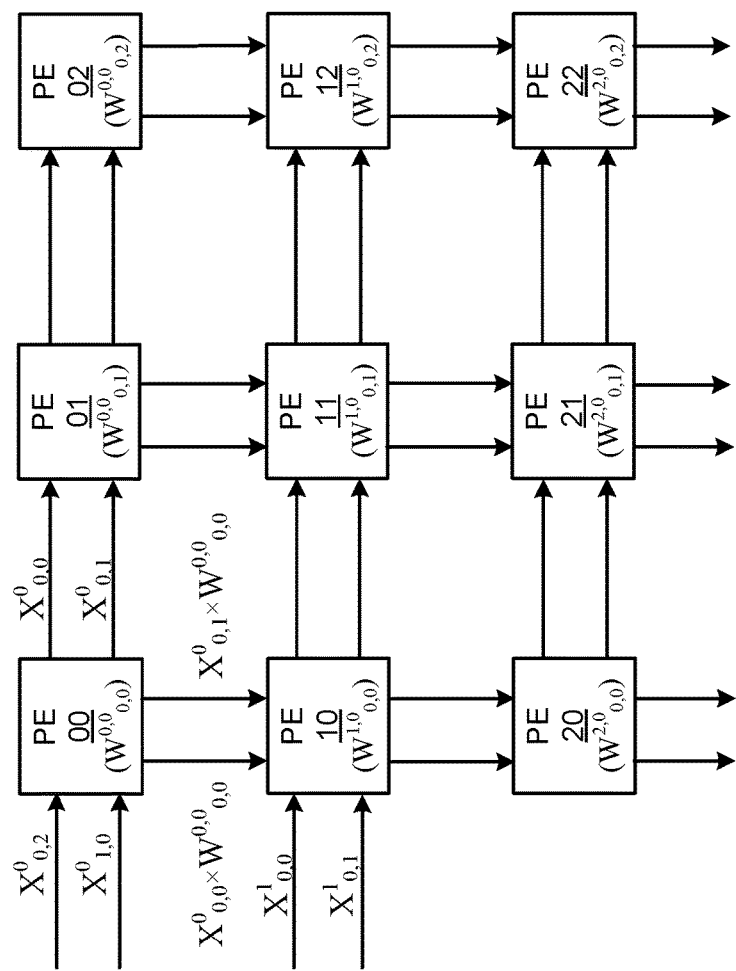

As shown in FIG. 9B, in the first cycle, the PE 00 may perform a first arithmetic operation concurrently on the two external sequential input elements. Performing the arithmetic operation concurrently may imply performing two arithmetic operations simultaneously or in parallel using two different circuits. For example, in one embodiment, the PE 00 may perform a multiplication of the $X^0_{0,0}$ with the $W^{0,0}_{0,0}$ using the first multiplier 808 to generate a first intermediate result ($X^0_{0,0} \times W^{0,0}_{0,0}$) and a multiplication of the $X^0_{0,1}$ with the $W^{0,0}_{0,0}$ using the) second multiplier 812 to generate a second intermediate result ($X^0_{0,1} \times W^{0,0}_{0,0}$). The first adder 810 may add the first intermediate result ($X^0_{0,0} \times W^{0,0}_{0,0}$) with the $Y_{IN1}$ to generate $Y_{OUT1}$. The second adder 814 may add the second intermediate result ($X^0_{0,1} \times W^{0,0}_{0,0}$) with the $Y_{IN2}$ to generate $Y_{OUT2}$. The $Y_{IN1}$ and $Y_{IN2}$ may be received by the PE 00 using a second interface (e.g., the column input data bus 818). Since the PE 00 corresponds to the top row of the array 900, the $Y_{IN1}$ and the $Y_{IN2}$ may be zero. Thus, the PE 00 may provide partial sums ($X^0_{0,0} \times W^{0,0}_{0,0}$) as the $Y_{OUT1}$, and ($X^0_{0,1} \times W^{0,0}_{0,0}$) as the $Y_{OUT2}$ to the PE 10. The PE 00 may also provide $X^0_{0,0}$ and $X^0_{0,1}$ as $X_{OUT1}$ and $X_{OUT2}$ to the PE 01.

In a second cycle, the next two external sequential input elements may be fed simultaneously to the PE 00, e.g., $X^0_{0,2}$ and $X^0_{1,0}$. In addition, the $X^0_{0,0}$ and $X^0_{0,1}$ may be fed to the PE01 as the $X_{IN1}$ and $X_{IN2}$ respectively. Furthermore, ($X^0_{0,0} \times W^{0,0}_{0,0}$) may be fed as the $Y_{IN1}$ and ($X^0_{0,1} \times W^{0,0}_{0,0}$) may be fed as the $Y_{IN2}$ to the PE 10. In the second cycle, $X^1_{0,0}$ and $X^1_{0,1}$ may also be fed simultaneously to the PE10 as the $X_{IN1}$ and $X_{IN2}$ respectively. The PE 00, PE 10, and PE 01 may perform arithmetic computations in parallel as shown in FIG. 9C.

Figure 9C:
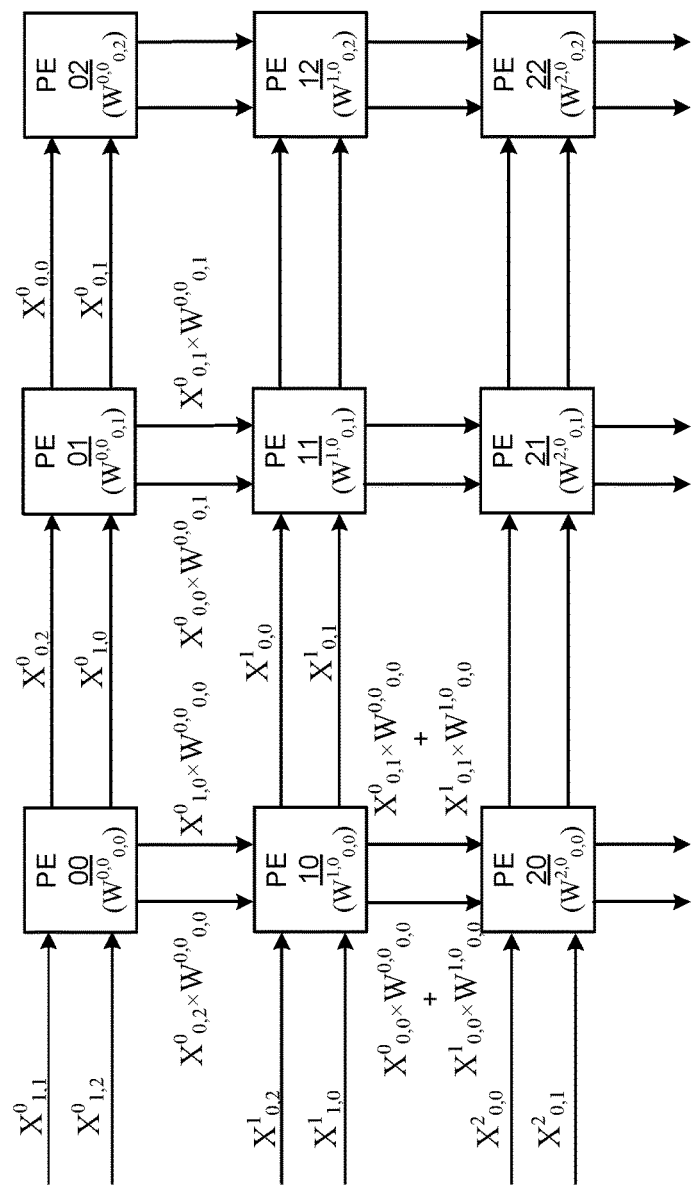

As shown in FIG. 9C, in the next cycle, the next two external sequential input elements may be fed simultaneously to the PE 00, e.g., $X^0_{1,1}$ and $X^0_{1,2}$. In addition, $X^1_{0,2}$ and $X^1_{1,0}$ may be fed to the PE10, and $X^2_{0,0}$ and $X^2_{0,1}$ may be fed to the PE20 simultaneously. The PE 00 may provide partial sums ($X^0_{0,2} \times W^{0,0}_{0,1}$) as the $Y_{OUT1}$, and ($X^0_{1,0} \times W_{0,0}$) as the $Y_{OUT2}$ to the PE 10. The PE 00 may also provide $X^0_{0,2}$ and $X^0_{1,0}$ as $X_{OUT1}$ and $X_{OUT2}$ to the PE 01. The PE 01 may provide partial sums ($X^{0,0}_{0,0} \times W^{0,0}_{0,1}$) as the $Y_{OUT1}$, and ($X^0_{0,1} \times W^{0,0}_{0,1}$) as the $Y_{OUT2}$ to the PE 11. The PE 01 may also provide $X^0_{0,0}$ and $X^0_{0,1}$ as $X_{OUT1}$ and $X_{OUT2}$ to the PE 02.

In the second cycle, the PE 10 may multiply $X^1_{0,0}$ with the $W^{1,0}_{0,0}$ using the first multiplier 808 to generate a first intermediate result ($X^1_{0,0} \times W^{1,0}_{0,0}$), and multiply $X^1_{0,1}$ with the $W^{1,0}_{0,0}$ using the second multiplier 812 to generate a second intermediate result ($X^1_{0,1} \times W^{1,0}_{0,0}$). The PE 10 may further add the first intermediate result ($X^1_{0,0} \times W^{1,0}_{0,0}$) with the partial sum ($X^0_{0,0} \times W^{0,0}_{0,0}$) provided by the PE 00 using the first adder 810 to generate a partial sum (($X^0_{0,0} \times W^{0,0}_{0,0}$)+($X^1_{0,0} \times W^{1,0}_{0,0}$)). The PE 20 may also add the second intermediate result ($X^1_{0,1} \times W^{1,0}_{0,0}$) with the partial sum ($X^0_{0,1} \times W^{0,0}_{0,0}$) provided by the PE 00 using the second adder 812 to generate a partial sum (($X^0_{0,1} \times W^{0,0}_{0,0}$)= ($X^1_{0,0} \times W^{1,0}_{0,0}$)). The partial sums generated by the PE 10 may be provided to the PE 20 as $Y_{OUT1}$ and $Y_{OUT2}$.

Figure 9D:
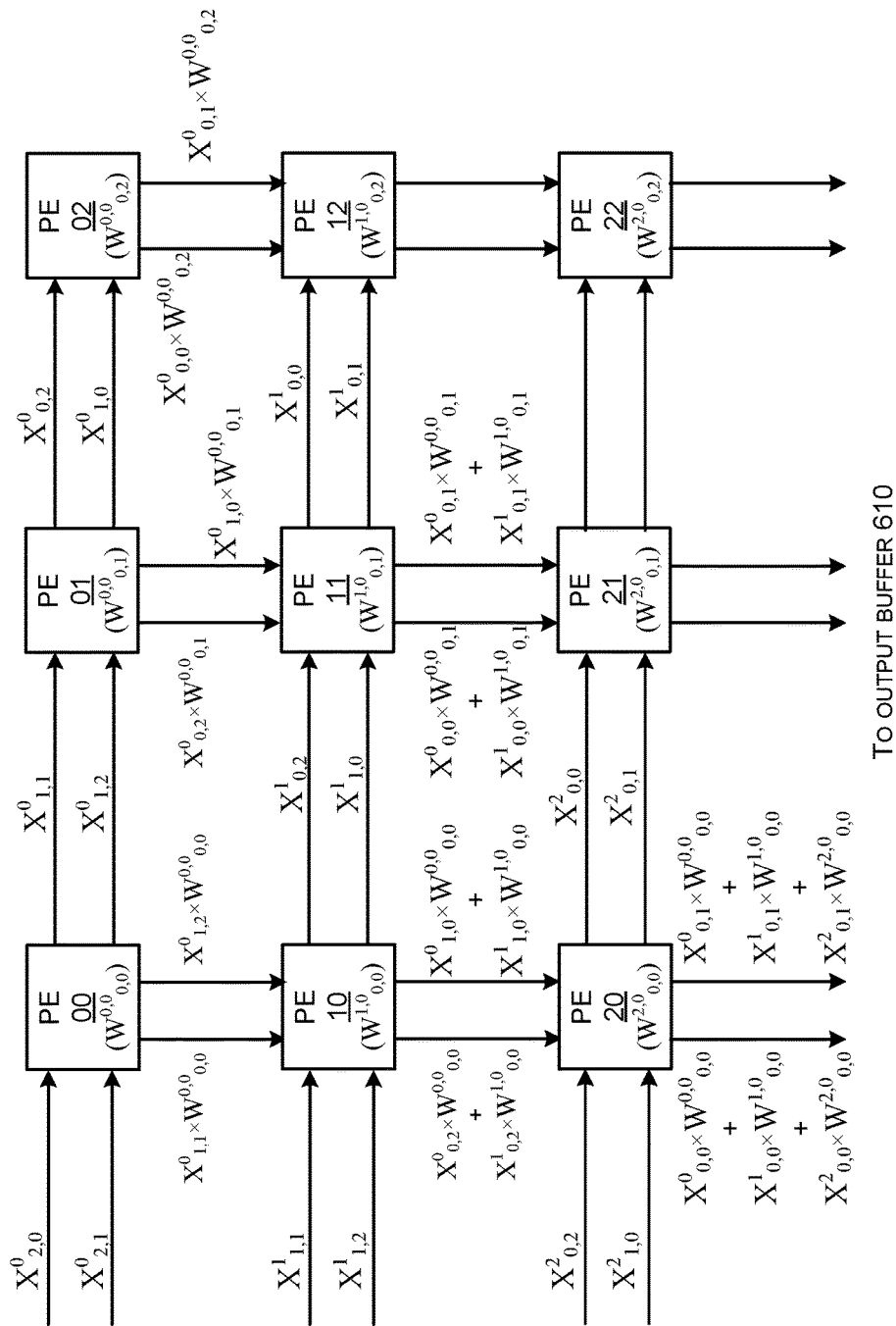

As shown in FIG. 9D, in the next cycle, the next two external sequential input elements may be fed simultaneously to the PE 00, e.g., $X^0_{2,0}$ and $X^0_{2,1}$. In addition, $X^1_{1,1}$ and $X^1_{1,2}$ may be fed to the PE10, and $X^2_{0,2}$ and $X^2_{1,0}$ may be fed to the PE20 simultaneously. The PE 00 may provide partial sums ($X_{0,4} \times W_{0,0}$) as the $Y_{OUT1}$, and ($X_{0,5} \times W_{0,0}$) as the $Y_{OUT2}$ to the PE 10. The PE 00 may also provide $X^0_{1,1}$ and $X^0_{1,2}$ as $X_{OUT1}$ and $X_{OUT2}$ respectively to the PE 01. The PE 01 may provide partial sums ($X^0_{0,2} \times W^{0,0}_{0,1}$) as the $Y_{OUT1}$, and ($X^0_{1,0} \times W^{0,0}_{0,0}$) as the $Y_{OUT2}$ to the PE 11. The PE 01 may also provide $X^0_{0,2}$ and $X^0_{1,0}$ as $X_{OUT1}$ and $X_{OUT2}$ to the PE 02. The PE 02 may provide partial sums ($X_{0,0} \times W_{0,2}$) as the $Y_{OUT1}$, and ($X_{0,1} \times W_{0,2}$) as the $Y_{OUT2}$ to the PE 12.

In parallel, the PE 10 may multiply $X^1_{0,2}$ with the $W^{1,0}_{0,0}$ using the first multiplier 808 to generate a first intermediate result ($X^1_{0,2}$) and multiply $X^1_{1,0}$ with the $W^{1,0}_{0,0}$ using the second multiplier 812 to generate a second intermediate result ($X^1_{1,0} \times W^{1,0}_{0,0}$). The PE 10 may further add the first intermediate result ($X_{1,2} \times W_{1,0}$) with the partial sum ($X^0_{0,2} \times W^{0,0}_{0,0}$) provided by the PE 00 using the first adder 810 to generate a partial sum (($X^0_{0,2} \times W^{0,0}_{0,0}$) ($X^0_{0,2} \times W^{1,0}_{0,0}$)). The PE 10 may also add the second intermediate result ($X^1_{1,0} \times W^{1,0}_{0,0}$) with the partial sum ($X^0_{1,0} \times W^{0,0}_{0,0}$) provided by the PE 00 using the second adder 812 to generate a partial sum (($X^0_{1,0} \times W^{0,0}_{0,0}$)+($X^1_{1,0} \times W^{1,0}_{0,0}$). The partial sums generated by the PE 10 may be provided to the PE 20 as $Y_{OUT1}$ and $Y_{OUT2}$.

In parallel, the PE 11 may multiply $X^1_{0,0}$ with the $W^{1,0}_{0,1}$ using the first multiplier 808 to generate a first intermediate result ($X^1_{0,0} \times W^{1,0}_{0,1}$) and multiply $X^1_0,1$ with the $W^{1,0}_{0,1}$ using the second multiplier 812 to generate a second intermediate result ($X^1_{0,1} \times W^{1,0}_{0,1}$). The PE 11 may further add the first intermediate result ($X^1_{0,0} \times W^{1,0}_{0,1}$) with the partial sum ($X^0_{0,0} \times W^{0,0}_{0,1}$) provided by the PE 01 using the first adder 810 to generate a partial sum (($X^0_{0,0} \times W^{0,0}_{0,1}$)+ ($X^1_{0,0} \times W^{1,0}_{0,1}$)). The PE 11 may also add the second intermediate result ($X^1_{0,1} \times W^{1,0}_{0,1}$) with the partial sum ($X^0_{0,1} \times W^{0,0}_{0,1}$) provided by the PE 01 using the second adder 812 to generate a partial sum (($X^0_{0,1} \times W^{0,0}_{0,1}$)+($X^1_{0,1} \times W^{1,0}_{0,1}$)). The partial sums generated by the PE 11 may be provided to the PE 21 as $Y_{OUT1}$ and $Y_{OUT2}$.

In parallel, the PE 20 may multiply $X^2_{0,0}$ with the $W^{2,0}_{0,0}$ using the first multiplier 808 to generate a first intermediate result ($X^2_{0,0} \times W^{2,0}_{0,0}$) and multiply $X^2_{0,1}$ with the $W^{2,0}_{0,0}$ using the second multiplier 812 to generate a second intermediate result ($X^2_{0,1} \times W^{2,0}_{0,0}$). The PE 20 may further add the first intermediate result ($X^2_{0,0} \times W^{2,0}_{0,0}$) with the partial sum (($X^0_{0,0} \times W^{0,0}_{0,1}$) ($X^1_{0,0} \times W^{1,0}_{0,0}$)) provided by the PE 10 using the first adder 810 to generate a partial sum ((($X^0_{0,0} \times W^{0,0}_{0,0}$)+($X^1_{0,0} \times W^{1,0}_{0,0}$))+$X^2_{0,0} \times W^{2,0}_{0,0}$)). The PE 20 may also add the second intermediate result ($X^2_{0,1} \times W^{2,0}_{0,0}$) with the partial sum (($X^0_{0,1} \times W^{0,0}_{0,0}$)+($X^1_{0,1} \times W^{1,0}_{0,0}$)) provided by the PE 10 using the second adder 812 to generate a partial sum ((($X^0_{0,1} \times W^{0,0}_{0,0}$) ($X^1_{0,1} \times W^{1,0}_{0,0}$))× $X^2_{0,1} \times W^{2,0}_{0,0}$)). The partial sums generated by the PE 20 may be provided to the output buffer 610. The output buffer 610 may continue to accumulate the partial sums for all the columns as remaining data elements for each input data set are propagated horizontally. After a certain number of cycles, each of the columns of the array 900 may provide two partials sum simultaneously corresponding to two output data elements.

It will be noted that even though FIGS. 9A-9D have been discussed using the first multiplier 808 and the first adder 810 to generate the partial sum $Y_{OUT1}$, and the second multiplier 812 and the second adder 812 to generate the partial sum $Y_{OUT2}$, in a different embodiment, the first FMA 824 may be used in place of the first multiplier 808 and the first adder 810 to generate the partial sum $Y_{OUT1}$, and the second FMA 826 may be used in place of the second multiplier 812 and the second adder 812 to generate the partial sum $Y_{OUT2}$.

As the last data element (e.g., $X^0_{2,2}$) of the indataset0 propagates through the PE00, another set of input data sets (e.g., shifted with the stride "D") can be fed to the PE00 to be scaled with a next set of weights. The output data elements stored in the output buffer 610 may be provided to the state buffer 608 by the computation controller 606 to be used as the first Yin element and second Yin element for the respective columns. Thus, certain embodiments can improve the performance of the systolic array by providing two or more output data elements corresponding to an output data set per column.

Figure 10:
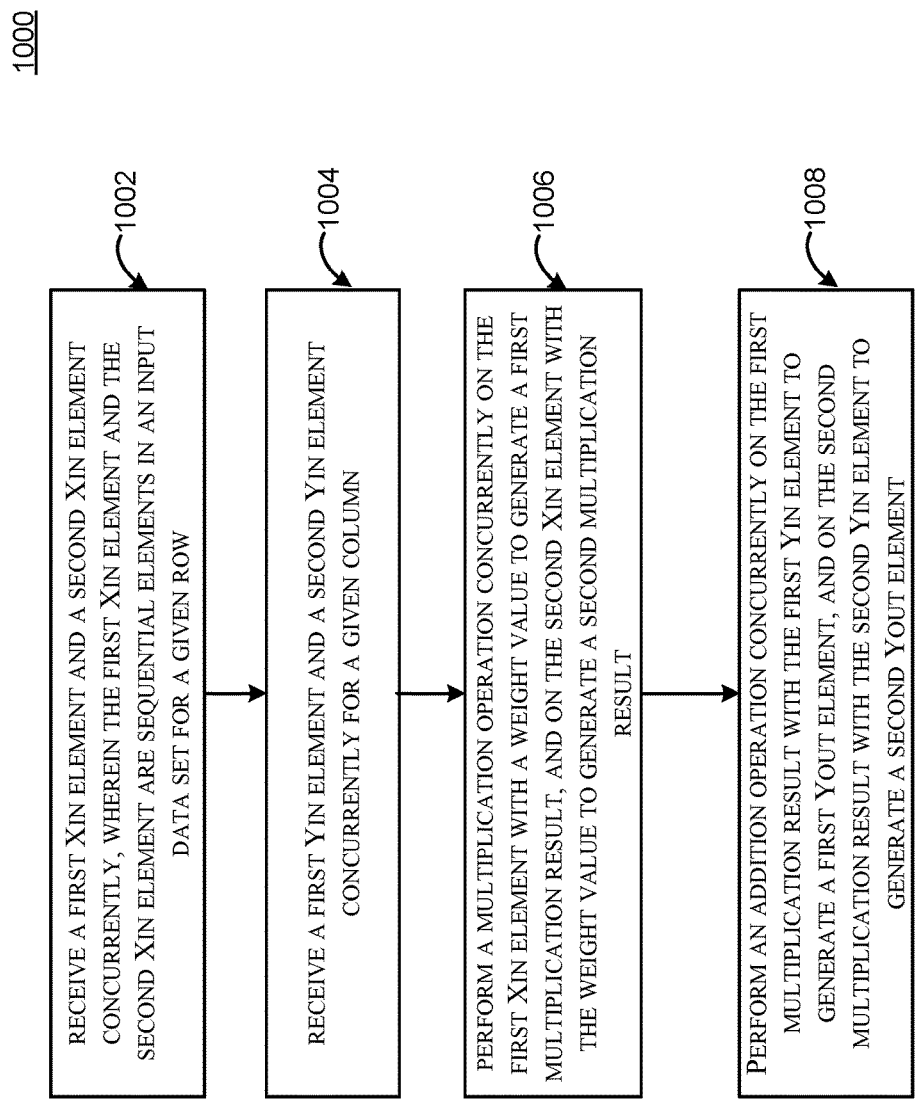
FIG. 10 shows a method executed by a PE for efficient utilization of a systolic array, according to certain embodiments of the disclosed technologies.

FIG. 10 shows a method 1000 executed by a PE for efficient utilization of the systolic array, according to certain embodiments of the disclosed technologies. For example, the method 1000 may be executed by the PE 800 as discussed with reference to FIG. 8.

In step 1002, a processing element (PE) in a two-dimensional array of PEs may receive a first Xin element and a second Xin element concurrently. The PEs of the array may be arranged into rows and columns. Each row of the array may be mapped to a respective input data set and each column may be mapped to a respective output data set. The first Xin element and the second Xin element may be sequential elements in an input data set for a given row. Referring back to FIG. 7, the array may be the computing engine 604 and the PE may be the PE 00. The PE 00 may receive the input data set indataset0 comprising an Xin1 element and an Xin2 element. For example, as shown in FIG. 9A, the Xin1 may be $X_{0,0}$ and the Xin2 may be $X_{0,1}$. The PE 00 may have the weight $W_{0,0}$ cached in the weight register 806 prior to receiving the Xin1 element and the Xin2 element. As discussed with reference to FIG. 6, the computing engine 604 may have been configured to operate in the optimization mode by the computation controller 606 based on the size of the input data set, the number of PEs in the computing engine 604, size of the PE and the data type.

In step 1004, the PE may receive a first Yin element and a second Yin element concurrently for a given column. In some embodiments, values for the first Yin element and the second Yin element may be provided by the computation controller 606 since the PE 00 belongs to the topmost row of the array. For example, the first Yin element and the second Yin element for the topmost array may include stored values of the first Yout element and the second Yout element from a prior computation using a different set of weights.

In step 1006, the PE may perform a multiplication operation concurrently on the first Xin element with a weight value to generate a first multiplication result, and on the second Xin element with the weight value to generate a second multiplication result. Referring back to FIG. 8, in one embodiment, the PE 00 may perform the multiplication operation concurrently using the first multiplier 808 and the second multiplier 812 to generate the first multiplication result (e.g., $X^0_{0,0} \times W^{0,0}_{0,0}$) and the second multiplication result (e.g., $X^0_{0,1} \times W^{0,0}_{0,0}$).

In step 1008, the PE may perform an addition operation concurrently on the first multiplication result with the first Yin element to generate a first Yout element, and on the second multiplication result with the second Yin element to generate a second Yout element. Referring back to FIG. 8, the PE 00 may perform the addition operation concurrently using the first adder 810 and the second adder 814 to generate the first Yout element (e.g., $X^0_{0,0} \times W^{0,0}_{0,0}$) and the second Yout element (e.g., $X^0_{0,1} \times W^{0,0}_{0,0}$). The first Yout element and the second Yout element may be provided as the first Yin element and the second Yin element to the PE 10.

In another embodiment, the steps 1006 and 1008 may be performed in a single step by using the fused multiply add operations. For example, as discussed with reference to FIG. 8, the first FMA 824 may be used in place of the first multiplier 808 and the first adder 810 to generate the first Yout element, and the second FMA 826 may be used in place of the second multiplier 812 and the second adder 812 to generate the second Yout element. Thus, in certain embodiments, using the first FMA 824 and the second FMA 826 concurrently to perform the multiply add operations on two sequential Xin elements with the respective Yin elements can provide faster and accurate results as compared to using separate multipliers and adders. The first Yout element and the second Yout element may be provided as the first Yin element and the second Yin element to the PE 10.

As discussed previously, partials sums from the last row in the array may correspond to two output data elements corresponding to an output data set for the given column. For example, referring back to FIG. 7, the output data set for each column can be stored in the output buffer 610. The computation engine 606 may provide the output data set from the output buffer 610 to the state buffer 608 to be used as the first Yin element and the second Yin element to the PE 00 for the next wave of computations. Thus, processing multiple Xin elements in parallel to generate multiple output data elements corresponding to the output data sets can improve the performance of the systolic array.

Figure 11:
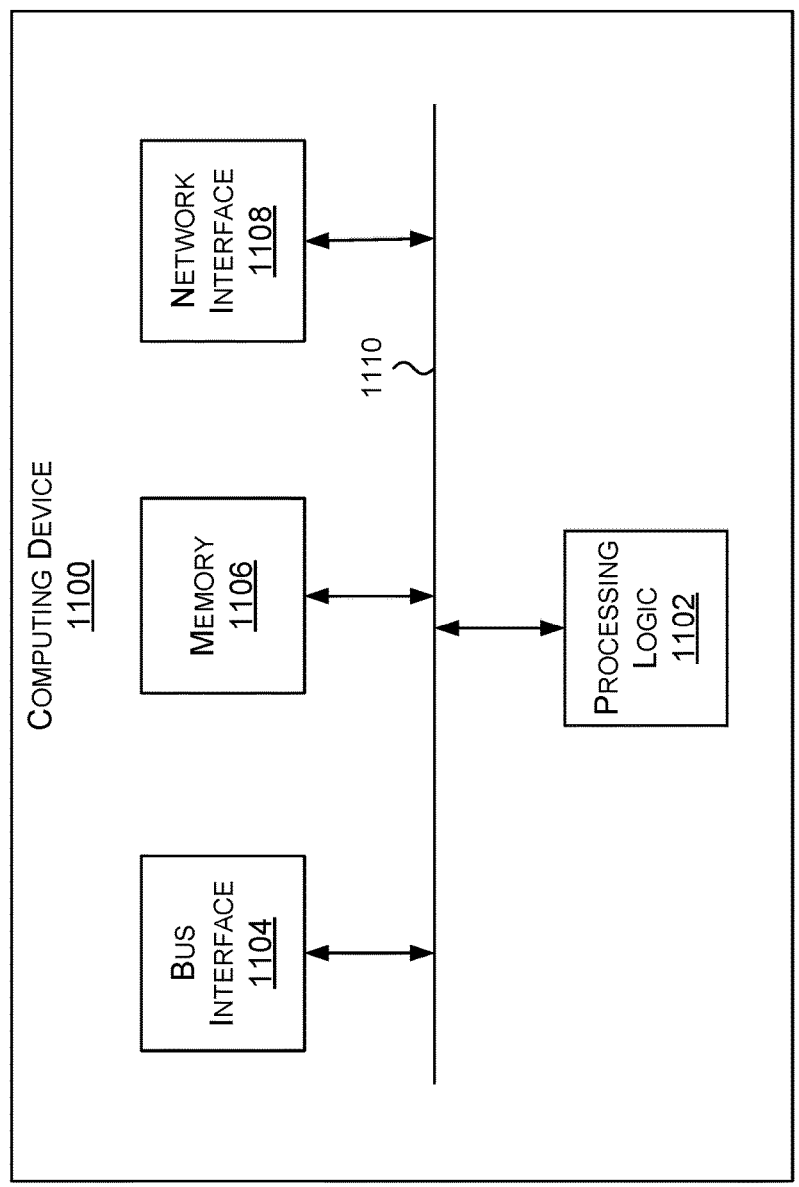
FIG. 11 illustrates an example of a computing device, according to certain aspects of the disclosure.

FIG. 11 illustrates an example of a computing device 1100. Functionality and/or several components of the computing device 1100 may be used without limitation with other embodiments disclosed elsewhere in this disclosure, without limitations. A computing device 1100 may perform computations to facilitate processing of a task. As an illustrative example, computing device 1100 can be part of a server in a multi-tenant compute service system. Various hardware and software resources of computing device 1100 (e.g., the hardware and software resources associated with provision of an image recognition service) can be allocated to a client upon request.

In one example, the computing device 1100 may include processing logic 1102, a bus interface 1104, memory 1106, and a network interface 1108. These components may be hardware modules, software modules, or a combination of hardware and software. In certain instances, components may be interchangeably used with modules or engines, without deviating from the scope of the disclosure. The computing device 1100 may include additional components, not illustrated here. In some implementations, the computing device 1100 may include fewer components. In some implementations, one or more of the components may be combined into one module. One or more of the components may be in communication with each other over a communication channel 1110. The communication channel 1110 may include one or more busses, meshes, matrices, fabrics, a combination of these communication channels, or some other suitable communication channel.

The processing logic 1102 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads.

Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1106. The processing logic 1102 may also include hardware circuities for performing artificial neural network computation including, for example, the neural network processor 602, etc.

The access to the processing logic 1102 can be granted to a client to provide the personal assistant service requested by the client. For example, the computing device 1100 may host a virtual machine, on which an image recognition software application can be executed. The image recognition software application, upon execution, may access the processing logic 1102 to predict, for example, an object included in an image. As another example, access to processing logic 1102 can also be granted as part of bare-metal instance, in which an image recognition software application executing on a client device (e.g., a remote computer, a smart phone, etc.) can directly access the processing logic 1102 to perform the recognition of an image.

The memory 1106 may include either volatile or non-volatile, or both volatile and non-volatile types of memory. The memory 1106 may, for example, include random access memory (RAM), read only memory (ROM), Electrically Erasable Programmable Read-Only Memory (EEPROM), flash memory, and/or some other suitable storage media. In some cases, some or all of the memory 1106 may be internal to the computing device 1100, while in other cases some or all of the memory may be external to the computing device 1100. The memory 1106 may store an operating system comprising executable instructions that, when executed by the processing logic 1102, provides the execution environment for executing instructions providing networking functionality for the computing device 1100. The memory 1106 may also store, for example, software applications for performing artificial neural network computation. For example, memory 1106 may store software routines related to the computations of equations 1-19 above. In a case where processing logic 1102 is in the form of FPGA, memory 1106 may store netlists data representing various logic circuit components of processing logic 1102.

The bus interface 1104 may enable communication with external entities, such as a host device and/or other components in a computing system, over an external communication medium. The bus interface 1104 may include a physical interface for connecting to a cable, socket, port, or other connection to the external communication medium. The bus interface 1104 may further include hardware and/or software to manage incoming and outgoing transactions. The bus interface 1104 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 1104 may include the physical layer for any of these bus protocols, including a connector, power management, and error handling, among other things. In some implementations, the computing device 1100 may include multiple bus interface modules for communicating with multiple external entities. These multiple bus interface modules may implement the same local bus protocol, different local bus protocols, or a combination of the same and different bus protocols.

The network interface 1108 may include hardware and/or software for communicating with a network. This network interface 1108 may, for example, include physical connectors or physical ports for wired connection to a network, and/or antennas for wireless communication to a network. The network interface 1108 may further include hardware and/or software configured to implement a network protocol stack. The network interface 1108 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1100 may include multiple network interface modules, each configured to communicate with a different network. For example, in these implementations, the computing device 1100 may include a network interface module for communicating with a wired Ethernet network, a wireless 802.11 network, a cellular network, an Infiniband network, etc. In some embodiments, computing device 1100 may receive a set of parameters, such as the aforementioned weight vectors for generation of forget gate factor, input factor, output factor, etc. from a server through network interface 1108.

The various components and modules of the computing device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A circuit for neural network computations, comprising:
a two-dimensional array comprising processing elements (PEs) arranged into rows and columns, wherein each row is mapped to a respective input data set and each column is mapped to a respective output data set, each input data set comprising respective X-in elements, each PE comprising:
memory to cache a weight value for a given PE;
a first input port to receive a first X-in element of an input data set for a given row;
a second input port to receive a second X-in element of the input data set for the given row, the second X-in element being sequential to the first X-in element;
a third input port to receive a first Y-in element for a given column;
a fourth input port to receive a second Y-in element for the given column;
a first multiplier configured to multiply the first X-in element with the weight value to generate a first multiplication result;
a first adder configured to add the first multiplication result with the first Y-in element to generate a first Y-out element;
a second multiplier configured to multiply, concurrently with the first multiplier, the second X-in element with the weight value to generate a second multiplication result; and
a second adder configured to add, concurrently with the first adder, the second multiplication result with the second Y-in element to generate a second Y-out element,
wherein the first Y-out element and the second Y-out element of a last row in the two-dimensional array correspond to an output data set for the given column.

2. The circuit of claim 1, wherein the first X-in element and the second X-in element correspond, respectively, to a first feature map element and a second feature map element of an input feature map.

3. The circuit of claim 1, wherein the first input port and the second input port are coupled to a row input data bus.

4. The circuit of claim 1, wherein the third input port and the fourth input port are coupled to a column input data bus.

5. An apparatus comprising:
a processing element (PE) for neural network computations, the PE configured to:
receive two sequential X-in elements concurrently via a first interface, the two sequential X-in elements comprising a first X-in element and a second X-in element;
receive two Y-in elements concurrently via a second interface, the two Y-in elements comprising a first Y-in element and a second Y-in element;
perform a first arithmetic operation concurrently on the first X-in element and a weight value to generate a first intermediate result, and on the second X-in element and the weight value to generate a second intermediate result; and
perform a second arithmetic operation concurrently on the first intermediate result and the first Y-in element to generate a first Y-out element, and on the second intermediate result and the second Y-in element to generate a second Y-out element;
wherein the PE is one of a plurality of PEs in an array, and wherein the first Y-out element and the second Y-out element of a last row in the array correspond to an output data set associated with a given column in the array.

6. The apparatus of claim 5, wherein the first arithmetic operation includes a multiplication operation, and wherein the first intermediate result is generated using a first multiplier and the second intermediate result is generated using a second multiplier.

7. The apparatus of claim 6, wherein the second arithmetic operation includes an addition operation, and wherein the first Y-out element is generated using a first adder and the second Y-out element is generated using a second adder.

8. The apparatus of claim 5, wherein the first arithmetic operation includes a multiplication operation, the second arithmetic operation includes an addition operation, and wherein the first arithmetic operation and the second arithmetic operation are performed in a single step using a fused multiplier adder.

9. The apparatus of claim 5, wherein the array is two-dimensional and is arranged into rows and columns, wherein each row is mapped to a respective input data set and each column is mapped to a respective output data set.

10. The apparatus of claim 9, wherein the first interface is associated with a row of the array, and wherein the first X-in element and the second X-in element for the PE correspond to an input data set associated with the row.

11. The apparatus of claim 9, wherein the second interface is associated with a column of the array.

12. The apparatus of claim 10, further comprising a computation controller coupled to the array, the computation controller configured to enable an operating mode of the array based on an input data type and a size of the input data set.

13. The apparatus of claim 5, wherein the weight value is loaded in the PE using the first interface or the second interface.

14. The apparatus of claim 9, further comprising a state buffer, wherein a first PE of each row is communicatively coupled to the state buffer, and wherein the state buffer is configured to store the respective input data set for each row of the array.

15. The apparatus of claim 14, wherein the respective input data set for each row of the array is received by the state buffer from a host device via a host interface.

16. The apparatus of claim 9, further comprising an output buffer, wherein a last PE of each column is communicatively coupled to the output buffer, wherein the output buffer is configured to store the first Y-out element and the second Y-out element corresponding to each column in the last row.

17. A method comprising:
receiving, by a processing element (PE) in a two-dimensional array of PEs, a first X-in element and a second X-in element concurrently, the PEs of the two-dimensional array arranged into rows and columns, wherein each row is mapped to a respective input data set and each column is mapped to a respective output data set, and wherein the first X-in element and the second X-in element are sequential elements in an input data set for a given row;

receiving, by the PE, a first Y-in element and a second Y-in element concurrently for a given column;

performing, by the PE, a multiplication operation concurrently on the first X-in element with a weight value to generate a first multiplication result, and on the second X-in element with the weight value to generate a second multiplication result; and performing, by the PE, an addition operation concurrently on the first multiplication result with the first Y-in element to generate a first Y-out element, and on the second multiplication result with the second Y-in element to generate a second Y-out element, wherein the first Y-out element and the second Y-out element of a last row in the two-dimensional array correspond to an output data set for the given column.

18. The method of claim 17, the method further comprising:
prior to receiving the first X-in element and the second X-in element, receiving the weight value for the PE; and
storing the weight value in a register.

19. The method of claim 17, wherein the PE is a first PE, the given row is a first row and the given column is a first column, the method further comprising:
providing the first X-in element and the second X-in element concurrently to a second PE in a second column and the first row of the two-dimensional array.

20. The method of claim 17, wherein the PE is a first PE and the given row is a first row, the method further comprising:
providing the first Y-out element and the second Y-out element concurrently as the first X-in element and the second X-in element to a second PE in a first column and a second row of the two-dimensional array.

* * * * *